United States Patent [19]

Devitt

[11] 4,240,081
[45] Dec. 16, 1980

[54] INK JET PRINTING

[75] Inventor: Edmund B. Devitt, Wayland, Mass.

[73] Assignee: Dennison Manufacturing Company, Framingham, Mass.

[21] Appl. No.: 951,101

[22] Filed: Oct. 13, 1978

[51] Int. Cl.³ .......................................... G01D 15/18
[52] U.S. Cl. .................................. 346/75; 346/140 R
[58] Field of Search ............................. 346/75, 140 R

[56] References Cited

U.S. PATENT DOCUMENTS

| 3,737,914 | 6/1973 | Hertz | 346/75 |
| 3,852,772 | 12/1974 | Hecht et al. | 346/75 |
| 4,050,075 | 9/1977 | Hertz et al. | 346/140 R X |

*Primary Examiner*—George H. Miller, Jr.
*Attorney, Agent, or Firm*—George E. Kersey; Arthur B. Moore

[57] ABSTRACT

Ink jet printing method and apparatus in which an ink stream is projected from an oscillating structure to a record member which moves relative to the oscillating structure, creating a trace on the record member. The ink jet printer includes a reed head assembly, which comprises a capillary tube, a metal reed attached thereto, and means for inducing macroscopic oscillations of the metal reed and attached capillary tube at a resonance frequency of the metal reed, in a direction transverse to the axis of the capillary tube. An alternative reed head assembly includes a capillary tube carrying a metal sleeve, with the capillary tube as the primary oscillating member. The reed head assembly may include an ultrasonic transducer for inducing microscopic longitudinal vibrations in the metal reed and capillary tube, thereby regulating the parameters of breakup of the ink stream emitted from the capillary tube. In another version, an externally supported ultrasonic transducer transmits microscopic longitudinal vibrations directly to the capillary tube. Closed loop feedback circuitry is included to maintain the frequency of macroscopic reed oscillation at or near the reed's resonance frequency. The ink jet system further includes a charging electrode for applying one of two charge levels to groups of ink droplets comprising "character elements". A deflection/interception structure causes the deflection of droplets bearing a "deflection" charge level and interception of one of the two charge groups, while allowing the other group to form an image on the record member.

10 Claims, 27 Drawing Figures

INK JET PRINTING

BACKGROUND OF THE INVENTION

The present invention relates to ink jet printing, and more particularly to printing with ink projected from an oscillating nozzle.

Prior art devices for recording with liquid ink may be categorized into those involving continuous or sporadic contact between a stylus and a recording medium, and those involving projection of ink onto a recording surface. The latter devices, known as "ink jets", may further be classified as to the matter in which the flow of ink is regulated, and as to the method by which the ink is targeted onto the recording medium. Ink flow is generally regulated through electrical means. By contrast, a variety of techniques have been utilized in directing the ink stream.

One ink drop targeting method, disclosed for example by Sweet in U.S. Pat. Nos. 3,373,437 and 3,596,275, and by Lewis in U.S. Pat. No. 3,298,030, involves charging the ink jet electrically and then deflecting it to the desired position on a record member. In this method, an ink stream is emitted from a nozzle which directs the stream generally toward a record member. Individual ink drops are quantitatively charged in an electrode placed near the point at which the jet breaks up into individual droplets. The size and separation of the droplets, and point of breakup, must be regulated carefully (typically by excitational means appended to the nozzle), as the mass and volume of the droplets will affect their eventual placement on the record member. The droplets pass through high voltage DC deflection electrodes, which create an electrical field surrounding the ink jet. The droplets are deflected within a plane according to the magnitude and polarity of charge received in the charging electrode. An extreme degree of deflection within this plane will cause droplets to be directed to an intercepting member. The above process of forming an image raises several difficulties. Each drop must be given a charge level which reflects not only its intended location on the record member, but also the charge levels given several previous drops (due to electrostatic interactions between the droplets). This requires quite complicated controlling electronics. Furthermore, as a one level targeting system (relying solely on electrostatic means to form the image), this system is relatively sensitive to noise due to electrical interference.

Another jet directing process, described by Hertz and Simonsson in U.S. Pat. No. 3,416,153, share with the above the features of an ink emitting nozzle and a charging electrode. In this method, however, the jet is charged to a degree that causes it to diffuse and form a spray. Diffused droplets (i.e. all but those in the undiffused jet path) may be prevented from reaching the record member by DC deflection electrodes similar to those of Sweet and Lewis, or by an apertured interception member.

A third method of image formation with an ink jet involves the projection of ink from an oscillating nozzle, with a record member which moves continuously in a direction essentially transverse both to the axis of the nozzle and the axis of oscillation. The result is that the ink jet traces a sinusoidal scanning pattern, and the image may be controlled by such factors as the spread of ink drops as they impinge on the recording surface, whether the ink jet is on or off, and the frequency and amplitude of oscillation.

The parameters of the frequency and amplitude of oscillation are subject to physical limits defined by the device employed to induce nozzle oscillation. One such device is comprised of a galvanometer attached near the tip of a glass capillary tube, with the tip bent at a right angle. The periodic torsion induced by an AC current through the galvanometer windings causes the nozzle tip to oscillate. Such a device is disclosed, for example, by Elmquist in U.S. Pat. No. 2,566,443. A range of frequencies may be obtained through this device, typically with a one to two KHZ upper limit, and no lower limit. This broad band device involves serious control problems, however, in that there is a phase lag at high frequencies between the actual location of the galvanometer and that perceived by a control mechanism, and this phase lag varies from frequency to frequency, making this device quite difficult to calibrate.

An alternative approach which avoids this drawback achieves the desired oscillation by means of a mechanically resonant structure, such as a vibrating metal reed. The reed carries a capillary tube from which the ink is projected, with the oscillations of the device confined to frequencies at or near the resonant frequency of the reed. The oscillation of the reed is induced by electromagnetic means. An example of an ink jet system of this type is disclosed by Hertz in U.S. Pat. No. 3,737,914. To produce a desirably high amplitude of nozzle oscillation, it is necessary in practical terms to drive the resonant structure at or near resonance. At significant deviations from the resonant frequency (i.e. outside the bandwidth), a substantial increase of current in the electromagnetic excitational means is required to produce the same amplitude of oscillation. This would entail overly high demands on the excitational means, and also involve a danger of saturation of the magnetic material of the metal reed. Driving such a structure at resonance, however, involves problems such as ink buildup on the reed, which causes a drifting of the frequency of resonance.

The drifting of the frequency of oscillation also raise problems in keeping the drop charging means in a correct phase relationship with the nozzle oscillations. One solution, which appears in Hertz U.S. Pat. No. 3,737,914, is to use an optical sensor to detect the position of the resonant structure, and use a signal generated thereby to regulate the charging process. Similarly, other transducers may be used for this purpose. These devices, however, often encounter operational difficulties when used in the vicinity of the ink stream.

Vibrating reed ink jet systems, and similar systems, also encounter difficulties at printing speeds higher than 100 characters per second. At high printing speeds, print quality tends to be inconsistent. Furthermore, printing of acceptable quality with a vibrating reed system has required the recording medium to pass within ⅛ inch of the electrode assembly which is used to control the flight of the ink drops. As a result, the printing of curved or recessed surfaces is difficult and often impossible.

In the vibrating reed system, the problems of inconsistent print quality and the low effective range of the ink jet stream may both be traced to the haphazard separation of the ink stream into individual drops. Various devices have been incorporated in other ink jet systems, such as those of Sweet and Lewis, with a view to regulating ink drop formation. A method generally employed in this regard involves inducing a pulsation of the ink stream at a controlled frequency. This has sometimes been accomplished by means of a transducer which is incorporated into the capillary structure, and placed in intimate contact with the ink stream, perhaps separated by a membrane. These devices, however, possess the shortcoming that the vibrations by which the ink stream pulsation is produced have transverse as well as longitudinal components with respect to the axis of the capillary tube. They therefore interfere, to some extent, with the transverse oscillations of the nozzle by which the scanning pattern is created in the third type of ink jet system. This effect is especially pronounced at higher printing speeds (higher frequencies of transverse nozzle oscillation).

The ability to print at higher speeds is correlative to a higher attainable frequency of character generation, which in turn is dependent on the resonant frequency of the reed. Speed limitations mentioned above with respect to prior art ink jet systems employing the scanning nozzle may be identified with a characteristic upper frequency limit of nozzle oscillation of around 1 KHz. For a vibrating reed system, a higher resonant frequency demands a shorter metal reed. Furthermore, to avoid high current demands in an electromagnetic means for inducing reed oscillation, a thin reed is desirable. Prior art vibrating reed systems have not incorporated a reed with these properties, as such a system necessitates a more compact design, and poses more rigorous construction tolerances in avoiding spurious resonances which might interfere with the high frequency reed oscillation.

An ink jet system incorporating an oscillating nozzle requires some means for gating ink drops, as the desired image is created by printing with selected drops. One type of gating system is that used by Sweet and Lewis, a charging electrode in combination with DC electrodes. Unlike Sweet and Lewis, however, these are used in an on/off mode, merely to remove unwanted droplets from the jet and allow the others to continue in a trajectory determined primarily by the nozzle oscillation. While the charging and deflection processes are not as critical as in Sweet and Lewis, they must nevertheless be carefully controlled to produce a high quality image.

Accordingly, it is a principal object of the invention to provide a workable ink jet system of the oscillating nozzle type. Related objects are a simplicity in the controlling electronics, and relative immunity to electrical interference. A subsidiary object of the invention is to achieve an oscillation of the ink jet nozzle by utilizing a magnetically resonant structure, such as a metal reed. A related object is the avoidance of phase calibration difficulties in the means for controlling nozzle oscillation.

Another object of the invention is the achievement of control over the frequency of nozzle vibration to ensure oscillation at or near the lowest resonance frequency of a metal rod. A related object is the avoidance of high current demands in electromagnetic means for inducing reed oscillation. Another related object is the inclusion of means to coordinate the ink jet gating means with the position of the oscillating nozzle. Such coordinating means should be operationally compatible with a liquid ink jet system.

It is a further object of the invention to provide ink jet printing at increased rates of speed. A correlative object is to increase the rate of character generation. A related object is to design a vibrating reed ink jet printing system incorporating a short, thin vibrating metal reed. Another related object is to design a more compact ink jet system which is compatible with a shorter metal reed.

Yet another object of the invention is to achieve ink jet printing with improved quality of print at higher printing speeds. A further object of the invention is to increase the effective range of the ink jet stream. A related object is to permit printing of acceptable quality upon materials at a greater distance from the ink jet nozzle. Another related ojbect is to make possible the printing of curved or recessed materials.

A secondary object which is related to the above objects is to regulate the flow of ink by creating a uniform ink drop size and spacing while controlling the location of ink jet breakup. A further related object is to employ means for this purpose which will not interfere with the transverse oscillation of the ink jet nozzle.

Still another object of the invention is the provision of means to charge selected ink droplets in order that certain droplets will be removed from the ink jet before reaching a record member. The charging and deflection processes should be carefully controlled to ensure an image of acceptable quality.

SUMMARY OF THE INVENTION

In accomplishing the above and related objets, the ink jet printer of the invention includes a reed head assembly, a charging electrode, an electronic controller, DC deflection electrodes, ink drop intercepting means, and a record member. Ink is supplied under pressure to an ink projecting member, whereby it is projected in a stream along a longitudinal axis of the ink projecting member, in the general direction of a record member. The ink projecting member is attached to a driving member, and the two are caused to oscillate at a resonance frequency of the combined structure. The direction of oscillation is transverse to the axis of the ink projecting member, causing the ink stream to be projected within a plane of trajectory variation. Closed loop feedback circuitry is used to control the frequency of oscillation, ensuring that it remains at or near the resonance frequency of the oscillating members. The ink stream emerging from the ink projecting member breaks up into individual ink drops, optionally under artificial stimulation, at which point selected ink droplets are charged by induction in a charging electrode. The fragmented ink stream passes through deflection electrodes where certain droplets are deflected in accordance with the charge previously received. The deflection occurs in a direction substantially transverse to the plane of trajectory variation, and causes a separation of the ink jet into two droplet groups. One group is intercepted, while the other group passes on to form an image on the record member, which advantageously moves relative to the reed head assembly in a direction substantially transverse to the plane of trajectory variation.

In accordance with a first embodiment of the invention, the reed head assembly includes a capillary tube, through which ink is forced under pressure, which is fixed at one end by a capillary mount and is secured along part of its length to a metal reed. The opposite end of the capillary tube is capped by a nozzle which directs the flow of ink. The metal reed is fixed in position by a reed clamp which is located at the midsection of the capillary tube.

In accordance with an alternative embodiment of the invention, the capillary tube carries a metal reed along a relaively small portion of its length, and only the capillary tube is secured by a clamp at its midsection.

In accordance with one aspect of these embodiments, the metal reed and capillary tube pass through a coil and permanent magnet structure, by means of which a vibration of the reed and capillary tube is produced in a direction substantially transverse to the axis of the capillary tube.

In accordance with another aspect of these embodiments, there is, in addition to this macroscopic vertical vibration of the reed and attached capillary tube, a microscopic longitudinal vibration. The microscopic longitudinal vibration is produced by an ultrasonic transducer. This microscopic longitudinal vibration of the reed and attached capillary tube determines the point at which the stream of ink from the capillary nozzle breaks up into drops, and increases the uniformity of drop size.

In accordance with a preferred version of the first embodiment, the ultrasonic transducer is comprised of a piezoelectric ceramic element which is appended to an extension of the metal reed beyond the reed clamp. This extension advantageously includes a metal paddle to which the ultrasonic transducer is attached. The piezoelectric ceramic element undergoes microscopic oscillations in response to an applied potential difference, which oscillations are transmitted to the considerably thinner attached metal paddle. The longitudinal component of the metal paddle oscillations are then picked up by the metal reed. The piezo-electric ceramic element may take various forms, including, for example, a round or rectangular cross section as seen from the bottom.

In accordance with an alternative version of both embodiments, the ultrasonic transducer is comprised of a piezo-electric ceramic element which contacts a portion of the capillary tube between the capillary tube mount and the clamp. Preferably, the ceramic element in this version is supported independently and bonded at one point to the capillary tube.

In accordance with another aspect of the invention, the ink jet system includes closed loop feedback circuitry for controlling the frequency of vibration of the ink projecting member and driving member. In the preferred reed head assembly embodiments incorporating a capillary tube and attached metal reed surrounded by a magnetic coil—permanent magnet structure, the magnetic coil is connected to a closed loop circuit for regulating the voltage applied to the coil's terminals. This circuit monitors the coil voltage, which has a resistive component, an inductive component, and a back EMF due to reed motion. The circuit derives a signal from the coil voltage in which the reed motion component dominates, amplifies the signal to create a supply voltage, and applies the supply voltage to the coil terminals.

In accordance with a particular embodiment of the closed loop feedback circuitry, this circuitry comprises a network which processes the reed motion component as a signal on top of the voltages due to the resistance and inductance of the coil. The circuit includes an operational amplifier which operates at maximum output during almost the entire reed oscillation period, and which essentially provides a supply voltage to drive the coil. The voltage across the coil is processed by additional circuit components to provide an output signal which is amplified by the operational amplifier. The component values are chosen to cause the network to process the coil voltage absent the reed motion component to provide op-amp inputs which alternate polarity at or somewhat above the expected reed oscillation frequency. This causes the circuit behavior to be dominated by the sinusoidal reed motion component when added to the other coil voltage components.

In accordance with an alternative embodiment of the closed loop feedback circuitry, this circuitry comprises a network which derives an interim signal representative of the resisitve and inductive reed voltage components, and uses this interim signal to produce an output which is proportional to the reed motion component. A proportionality constant is chosen to provide positive feedback only at or near the resonance frequency of the reed and capillary tube.

In accordance with a further aspect of the invention, the ink stream is charged by induction in a charging electrode at a point at which the stream breaks up into individual droplets. This charging determines which ink drops will reach the record member and which droplets will be intercepted. The charging electrode applies either a "deflection" or "no deflection" charge level. The placement of a droplet on the record member is determined not by the quantum of charge applied in the charging electrode, but by the position and motion of the nozzle when emitting the droplet.

In accordance with yet another aspect of the invention, the electronic controller regulates the charging process by coordinating this process with nozzle oscillation. The electronic controller, which receives a reed deflection signal from the driving circuitry, subdivides the reed oscillation cycle into a given number of character elements, which represent portions of the oscillation cycle of predetermined duration. The electronic controller supplies a voltage pulse train to the charging electrode, in accordance with a desired character pattern, such that all the ink droplets within a given "character element" are given an appropriate charge level. The number of ink droplets per character element is advantageously greater than or equal to four, to minimize image degradation due to ink droplets receiving an intermediate charge level during the switching of voltage levels.

In accordance with a related aspect of the invention, the reed oscillation cycle is preferably divided into usable and idle character elements. Advantageously, printing occurs during either the up or down strokes on the record member, and avoids the peaks of the scanning cycles. This method is appropriate to matrix printing of characters, wherein half cycles of sinusoidal scan are used for matrix columns, and character element subdivisions are used for matrix rows.

In accordance with still another aspect of the invention, the ink stream, now separated into individual droplets bearing one of two charge levels, passes from the charging electrode to a deflection electrode structure, where the droplets are subjected to a DC deflection field. The group of droplets bearing a deflection charge level separates from the other group in this field, the direction of deflection being substantially transverse to the plane of trajectory variation caused by nozzle oscillation. The intercepting means may be placed so as to minimize the loss of intermediately charged droplets, and may additionally include means to control stray ink droplets in the deflection electrodes.

BRIEF DESCRIPTION OF THE DRAWINGS

The above and related aspects of the invention are illustrated by reference to the detailed description which follows, taken in conjunction with the drawings in which.

DETAILED DESCRIPTION OF THE INVENTION

Reference should now be had to FIGS. 1 through 20 for a detailed description of the ink jet printer of the invention.

I. General System Description

Figure 1:
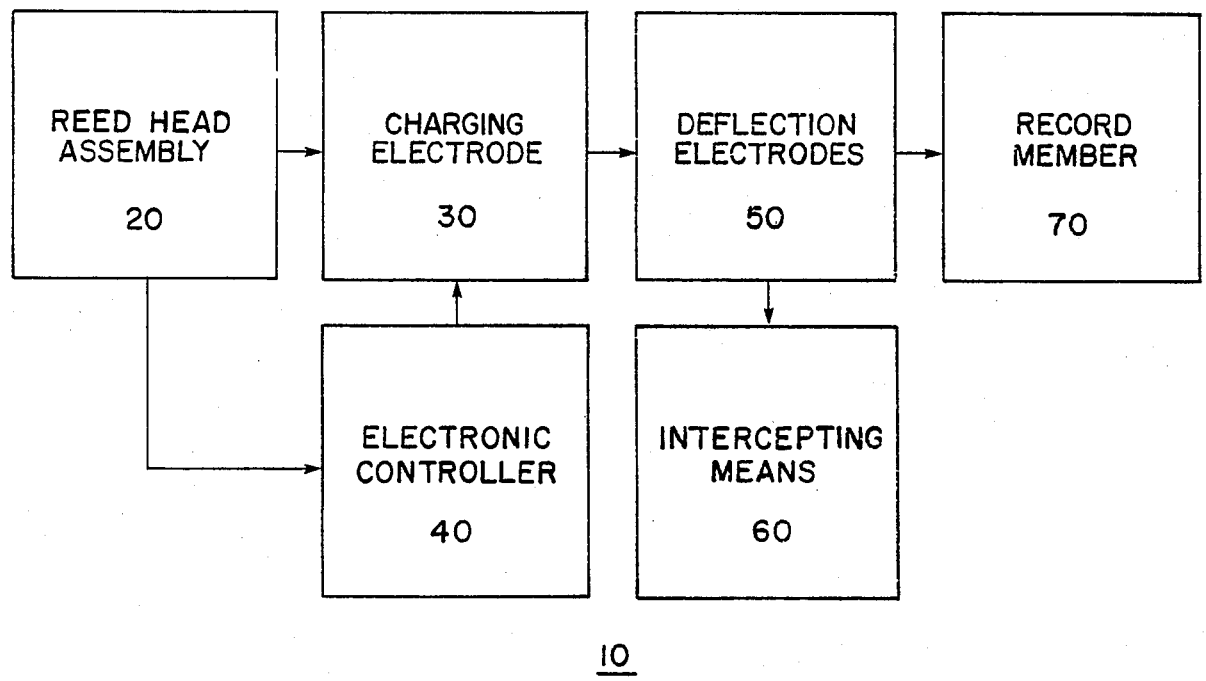
FIG. 1 is a functional block diagram of the ink jet printer of the invention.

As shown in the schematic diagram of FIG. 1, the ink jet system 10 includes a reed head assembly 20, a charging electrode 30, an electronic controller 40, deflection electrode(s) 50, intercepting means 60, and a record member 70.

The reed head assembly 20 includes a nozzle assembly connected to a source of ink under pressure, a driving member attached to the nozzle to produce oscillating motion transverse to the nozzle axis, an electromagnetic structure for inducing the oscillation of the resonant structure and nozzle assemby, and driver circuitry to control the frequency of oscillations so that the structure will be driven at or near resonance. See Part II for a discussion of the reed head assembly, and Part III for a discussion of the driving circuitry in particular.

Figure 2:
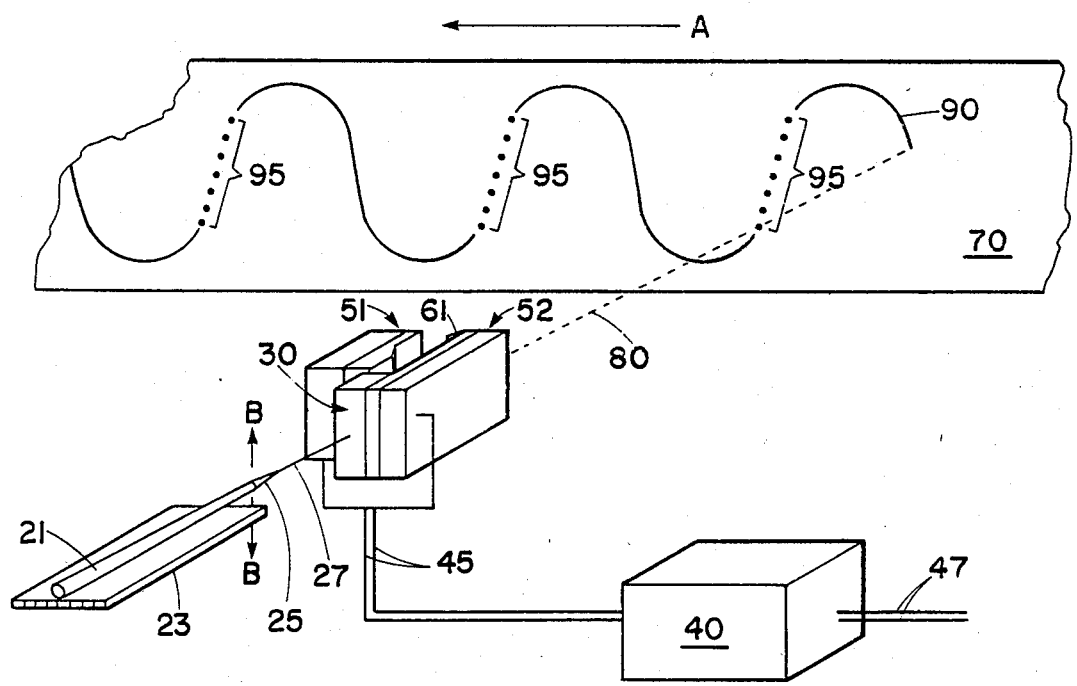
FIG. 2 is a partial perspective view of an ink jet printer creating a trace on a record web, in accordance with a preferred embodiment of the invention.

The charging electrode 30 comprises a structure of the type known for this purpose in the prior art, placed adjacent to or surrounding the ink stream near the point at which the continuous stream from the nozzle separates into individual drops. A voltage applied between this electrode and the ink stream, which must be electrically conductive, inductively charges the ink drops being formed. This is a simple on/off charging process. Drops either pass through the charging electrode 30 uncharged, or with a given charge Q, which will later determine which of these drops reach the record member 70. The quantum of charge given the charged droplets need not be exactly equal from drop to drop, however. As shown in FIG. 2, ink flows through capillary tube 21 (partially shown), emits from nozzle 25, and passes through the charging electrode 30 where the ink stream breaks up into individual drops. The capillary tube oscillates in conjunction with metal reed 23 (partially shown), this oscillation being induced by means not shown at the resonant frequency of the reed 23. As the ink stream 27 passes through charging electrode 30 and breaks up into discrete drops, these drops 29 are charged selectively by means of electronic controller 40, which is connected to the charging electrode by wires 45. Electronic controller 40 receives a timing signal through wires 47 from the driver circuitry (not shown). Using preprogrammed instructions for the printing of particular characters, electronic controller 40 uses the timing signal received from the driver circuitry (which tracks the nozzle position) to synchronize the charging process with the eventual position of the droplets in the image. See Part IV.

The ink stream, now in the form of charged and uncharged individual droplets, passes from the charging electrode 30 to deflection electrodes 50, where the charged droplets are deflected in a direction approximately perpendicular to the plane of vibration of the nozzle. An intercepting means 60 lies along a line parallel to the plane of vibration of the nozzle, and between the deflecting electrodes 50 and the record member 70. Intercepting means 60 may be separate or may be an integral part of the electrode structure. The intercepting means 60 receives ink droplets along its length and removes them to a waste container or to the ink reservoir. Intercepting means 60 may be positioned to operate in one of two modes. In the first, charged ink drops are deflected and removed, while the uncharged drops pass by to the surface to be printed. In the second, the uncharged drops are aimed at intercepting means 60 while charged drops are deflected to miss it and pass to the surface to be printed. See Part IV.

The process of diverting and intercepting selected ink droplets as prescribed by the invention may be contrasted to the similar process used by Sweet and Lewis. In Sweet and Lewis, the ink droplet trajectories lie within a single plane of variation, as induced by the quantitative charging of individual droplets and passage through DC deflection electrodes. The interception of droplets is merely an extreme case of deflection (or zero deflection) within this plane of trajectory variation. By contrast, the plane of trajectory variations of the present invention is a result of the oscillation of the ink emitting nozzle, as discussed above. The interception of unwanted ink drops occurs in a direction which is substantially transverse to this plane of trajectory variation. Indeed, it would not be practical to remove ink droplets from the ink jet by an extreme deflection within the plane of nozzle oscillation.

With further reference to FIG. 2, the record member 70 moves in a direction A which is perpendicular to the line of nozzle oscillation B. The result is a trace 90, which ideally is sinusoidal but actually is subject to aerodynamic distortions of the ink stream 80. Record member 70, which may for example be a moving web, is connected to means for producing a relative motion with respect to the nozzle assembly. The motion may be provided by means external to the ink jet system 10.

The charging and deflection electrodes are advantageously programmed by the electronic controller 40 to allow ink stream 80 to pass for less than half of each cycle. The result is that segments 95 of dots are printed, and no ink drops impinge on the recording medium 70 over the balance of the trace 90. See Part IV.

Figure 3:
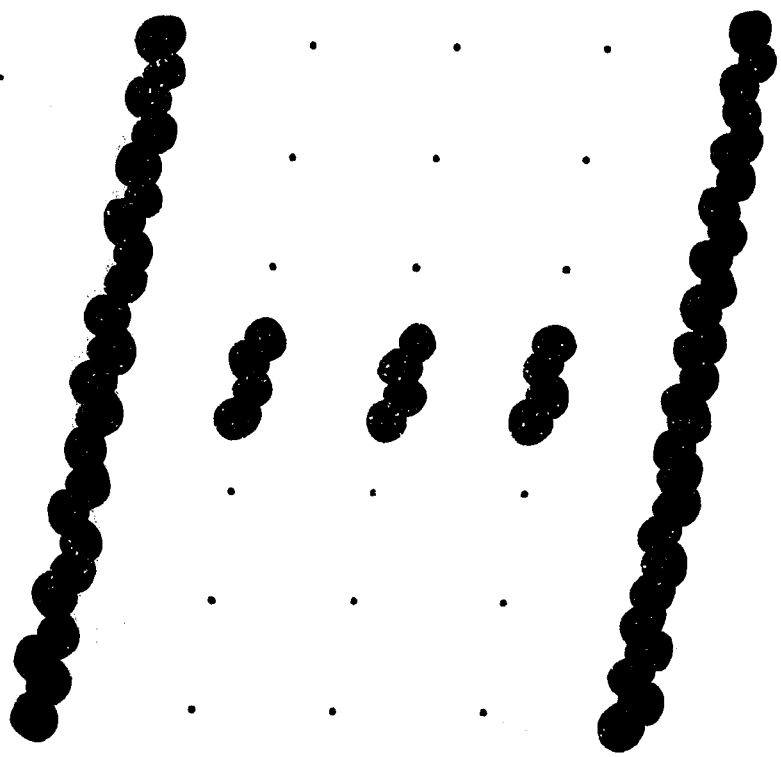
FIG. 3 is a 5×7 matrix image of the letter 'H', formed by the printer of FIG. 2.

By selectively removing certain drops from the ink stream, a given character may be printed. FIG. 3 illustrates a 5×7 matrix printout of the letter H.

In a particular embodiment of the invention, an ultrasonic transducer may be included in reed head assembly 20. This will cause the drop formation process in charging electrode 30 to be more uniform and controlled. In addition, the signal driving this transducer may be used to synchronize the switching of the voltage levels applied between the ink and charging electrode with the formation of individual droplets. See Parts II, IV.

II. Reed Head Assembly

Figure 4:
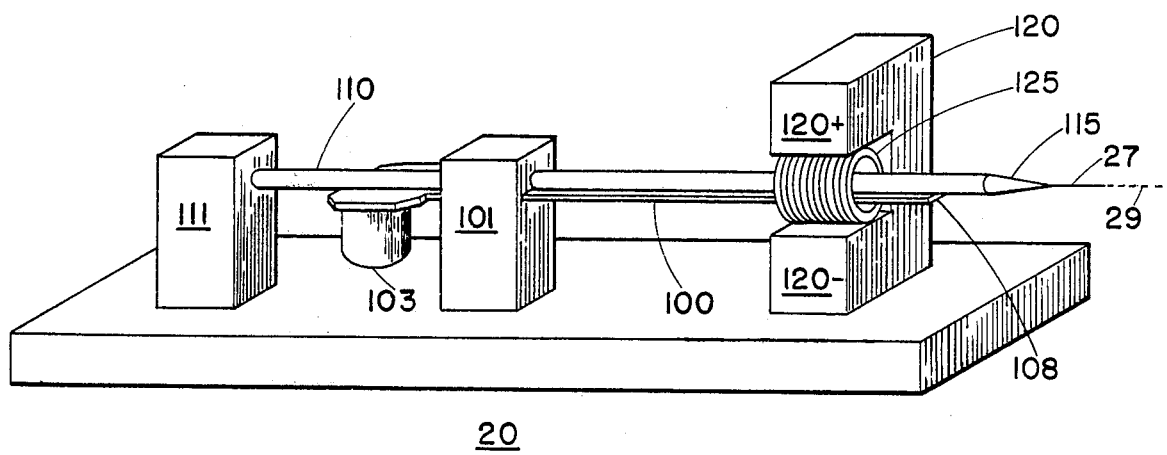
FIG. 4 is a plan view of a reed head assembly in accordance with a preferred embodiment of the invention.

As shown in a preferred embodiment in FIG. 4, the reed head assembly 20 is comprised of a metal reed 100, a reed clamp 101, an ultrasonic transducer 103, a capillary tube 110, a capillary tube mount 111, a nozzle 115 (in this Part only, "nozzle" is used to denote an element capping the ink emitting member, rather than the member itself), a permanent magnet 120, and a coil 125. A capillary tube 110 is secured at one end by a capillary tube mount 111 and is capped at the opposite end by a nozzle 115, which is customarily a drawn out portion of the capillary tube. A filter (not shown) is ordinarily placed in the capillary tube to prevent infiltration by unwanted particles. The capillary tube 110 passes through a reed clamp 101 which is located at its midsection, and is yoked along the remainder of its length to a metal reed 100, which reed in turn is secured by the reed clamp 101. The use of a separate capillary tube mount and reed clamp, structures which are characteristically combined in the prior art, facilitates the use of a short vibrating metal reed (that is, a reed which is substantially shorter than the capillary tube). Ink 27 is supplied by a reservoir (not shown), forced under pressure through the capillary tube 110, and emitted through the nozzle 115.

The fluid pressure on ink stream 27 is supplied by a pump (not shown).

Figure 5:
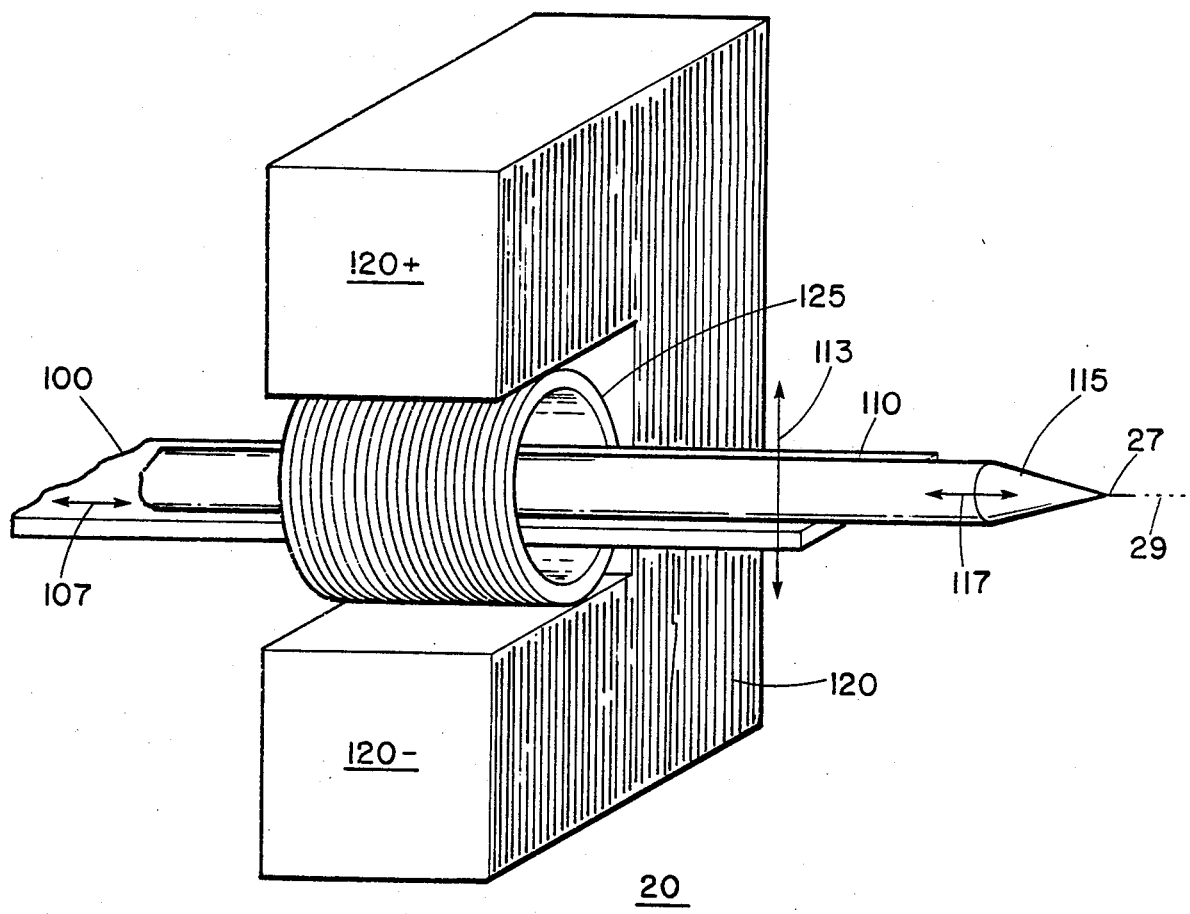
FIG. 5 is a perspective view of the coil area of the reed head assembly of FIG. 4.

A vertical vibration of the reed and attached capillary tube, shown by the arrows 113 in FIG. 5, is created by the interaction of a magnetization of the reed 100 along its length with a magnetic field (not shown). The reed 100 is magnetized by a coil 125, through which the reed 100 and the capillary tube 110 pass. The magnetic field is produced by a permanent magnet 120. The interaction between the magnetic moment induced in the metal reed 100 and the permanent magnet's field creates a torque on the reed 100, forcing it to bend toward one of the poles, 120+ or 120−, of the permanent magnet 120, as shown in FIG. 5. When the current in the coil 125 is reversed, an opposite torque is created and the reed is forced toward the other pole. When the coil current is alternating at a frequency near the lowest resonance of the reed, viewed as a cantilever beam anchored at the reed clamp 101, a large amplitude motion (on the order of several millimeters) is produced.

As shown in FIGS. 4 and 5, permanent magnet 120 surrounds coil 125. It is equally feasible, however, to have these placed at different locations along the length of metal reed 100.

Figure 6A:
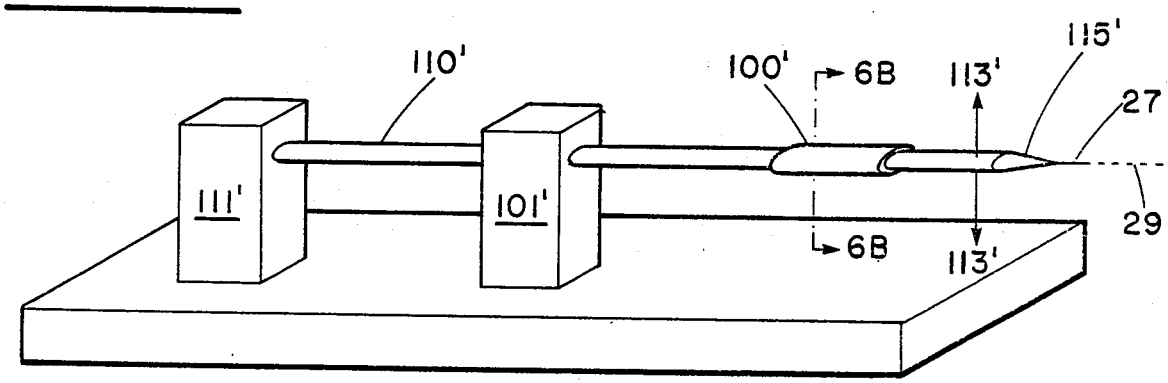
FIG. 6A is a partial plan view of a reed head assembly in accordance with an alternative embodiment of the invention.

An alternative embodiment 20′ of the reed head assembly is shown in the partial perspective view of FIG. 6A. A glass tube 110′ is mounted at 111′, clamped at its midsection by tube clamp 101′, and capped by nozzle 115′. In this embodiment, the glass tube is surrounded by a metal sleeve 100′ which is attached at a point beyond the clamp 101′. A permanent magnet and coil structure (not shown) such as that illustrated in FIG. 5 surrounds the glass tube 110′ at the segment carrying the sleeve 100′. A torque is exerted on glass tube 110′ by means of an alternating polarity magnetization of metal sleeve 100′, and consequent alternating attraction to the two poles of the permanent magnet. This causes an oscillation 113′ of the glass tube 110′, acting as a cantilever beam. Reed head assembly 20′ optionally includes ink stream excitational means (not shown) between tube mount 111′ and tube clamp 101′.

Figure 6B:
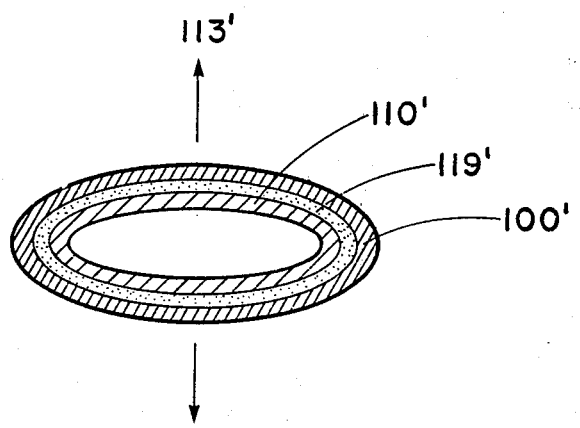
FIG. 6B is a section taken along the line 6B—6B in FIG. 6A, showing a cross section of the capillary tube and metal sleeve.

The cross sectional view of FIG. 6B shows glass tube 110′ bonded to metal sleeve 100′ by a suitable adhesive material 119′. Tube 110′ and sleeve 100′ advantageously have flattened oval cross sections in order to increase the tendency of these members to oscillate along axis 113′.

In both of the above embodiments, the natural frequency of oscillation of the glass tube-driving member structure reflects structural properties of both members. By increasing the size of the capillary tube 110 in the reed-tube embodiment, for example, the resonant frequency of the structure as a whole is increased. In the embodiment of FIG. 4, the reed behavior dominates, while in the embodiment of FIG. 6A, the properties of the glass tube 110′ are primarily relevant.

It has been observed that, during operation of the reed head assembly with a regular flow of ink, a residue of ink accumulates on various structures including the metal reed 100. The buildup of ink on the thin, short metal reed results in a significant shifting of the resonant frequency of the reed over the course of an hour. Similarly, there is a tendency when driving directly from an oscillator for the oscillation to drift. Because of the difficulty of driving the reed at off-resonance frequencies, it is necessary to monitor the motion of the reed in some way and compensate for any frequency shifts. Advantageous circuitry for this purpose is discussed below in Section III.

A problem which must be considered in designing and operating a vibrating reed ink jet system is that of metal fatigue. This turns out in practice not to be a serious limiting factor. Because of the transverse component of the velocity of ink drops emitted from the vibrating nozzle, the angular spread of drops on the record member 70 is greater than the maximum angle described by the nozzle during oscillation. Thus, a relatively low amplitude vibration will result in an image of desired size.

In addition to the macroscopic vertical vibration 113, a microscopic longitudinal vibration, shown by arrows 107 in FIG. 5, may be created along the length of the reed 100 by an ultrasonic transducer 103. The ultrasonic transducer 103 is attached to a stationary portion of the reed 100 at a point beyond the reed clamp 101. The microscopic longitudinal vibration 107 of the reed 100 creates a corresponding longitudinal vibration 117 of the attached capillary tube 110 and nozzle 115.

Some excitational means such as the ultrasonic transducer 103, while not essential to the ink jet system of the invention, is advantageously included to ensure increased printing distances with enhanced image quality. The vibration 117 of the nozzle 115 determines the point at which the stream of ink 27 emitted from the nozzle 115 breaks up into drops, as shown at 29 in FIG. 5. This vibration also ensures uniformity of drop size, which in turn increases the effective distance over which the fragmented ink stream 29 will travel. The permissible distance between the reed head assembly 10 and the object to be imprinted (not shown) is thereby increased.

In an alternative embodiment, the signal used to drive ultrasonic transducer is fed to electronic controller 40 to synchronize the switching of voltage levels for charging selected droplets in charging electrode 30. See Part IV.

The use of ultrasonic transducers for these purposes is not new, but the ultrasonic transducing means of the invention possesses novel characteristics and advantages. The ultrasonic transducer 103 of the invention does not involve direct perturbation of the ink jet or perturbation through a membrane, as is commonly done, but instead imparts microscopic longitudinal pulses to the ink stream 27 through the intermediate vibration of the metal reed 100 and capillary tube 110.

This can advantageously be done by attaching a piezoelectric ceramic device to the stationary section of the metal reed beyond the reed clamp 101, in order that the transverse oscillation 113 of the reed does not hinder the operation of the device. Such a device may take a number of forms, but all share the characteristic that they impart strictly longitudinal vibrations to the metal reed 100, vibrations which are microscopic in amplitude as compared with the typically several millimeter transverse oscillation 113 of the joined metal reed and capillary tube. Thus, the longitudinal vibrations 107 and 117 do not significantly interfere with the transverse vibrations 113.

Figure 7A:
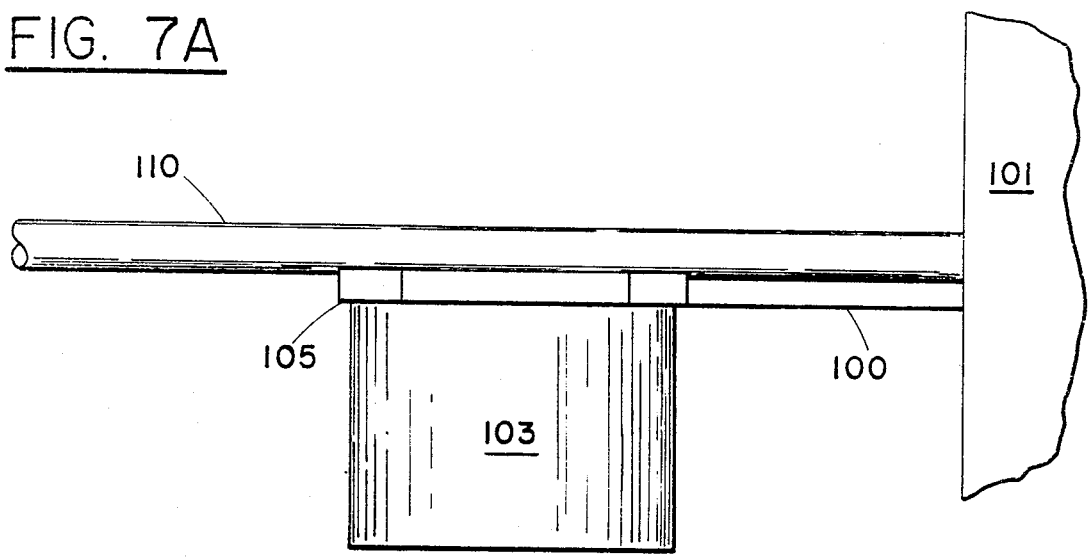
FIG. 7A is a plan view of the ultrasonic transducer area of the reed head assembly of FIG. 4, as seen from the side.
Figure 7B:
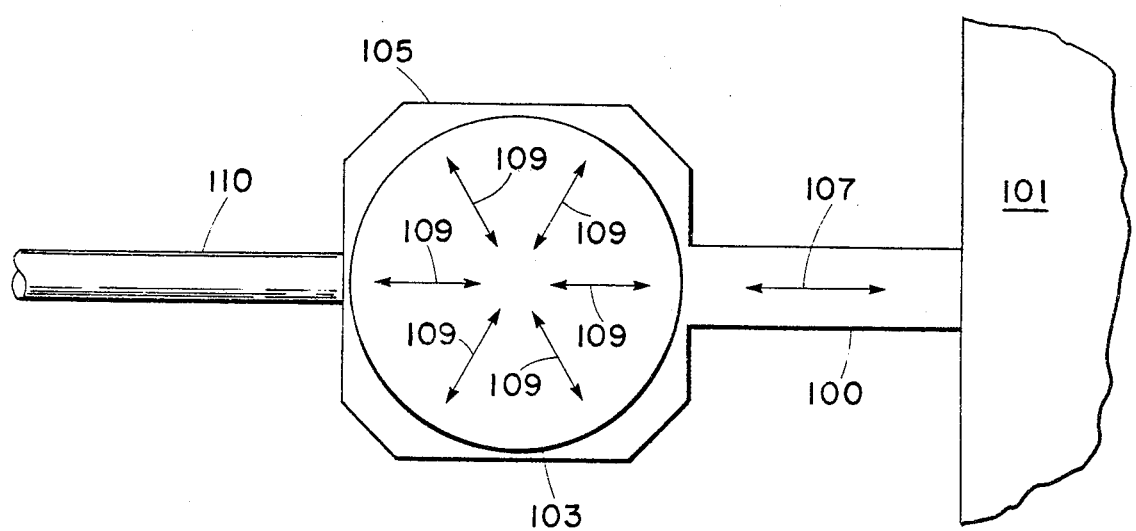
FIG. 7B is a plan view of the ultrasonic transducer area of the reed head assembly of FIG. 4, as seen from below.

A particular embodiment of the ultrasonic transducer of the invention is illustrated in FIGS. 7A and 7B, one involving a piezoelectric ceramic of cylindrical form. The side view, FIG. 7A, displays a relatively thick transducer 103 appended to a thin metal paddle 105 at the end of the metal reed 100. The disproportionate thickness of transducer 103 (which is advantageously) eight to ten times the thickness of the metal reed 100 and paddle 105) causes the paddle 105 to readily pick up any vibrations in the horizontal plane (the plane of interface) of the transducer 103. The vibrations of the transducer 103 result from the piezoelectric effect of a voltage (not shown) which is applied between the paddle 105 and the bottom surface of the transducer 103. This causes a radial expansion and contraction of the cylindrical transducer 103.

The bottom view, FIG. 7B, illustrates the process of transmittal of vibrations. The piezoelectric ceramic 103, round in cross section, is roughly the same size as the paddle 105, which is square in cross section with truncated corners. The radially expanding and contracting oscillations of the transducer 103, shown by arrows 109, are transmitted to the coupled metal paddle 105 to produce similar oscillations. The metal reed 100, connected to the middle of one side of the metal paddle 105, picks up only those oscillations of the paddle which are oriented along the axis of the reed. This results in almost purely longitudinal vibrations 107 of the metal reed 100. The partially shown reed clamp 101 is preferably constructed of a plastics material which will allow the microscopic longitudinal vibrations 107 to pass through unabated, without any spurious resonances added (these would be present, for example, with a metal clamp).

Figure 8A:
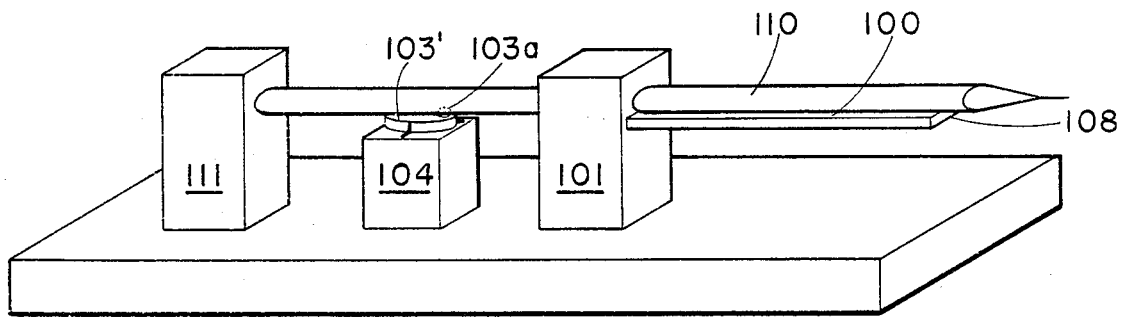
FIG. 8A is a plan view of a reed head assembly in accordance with an alternative version of the embodiment of FIG. 4.
Figure 8B:
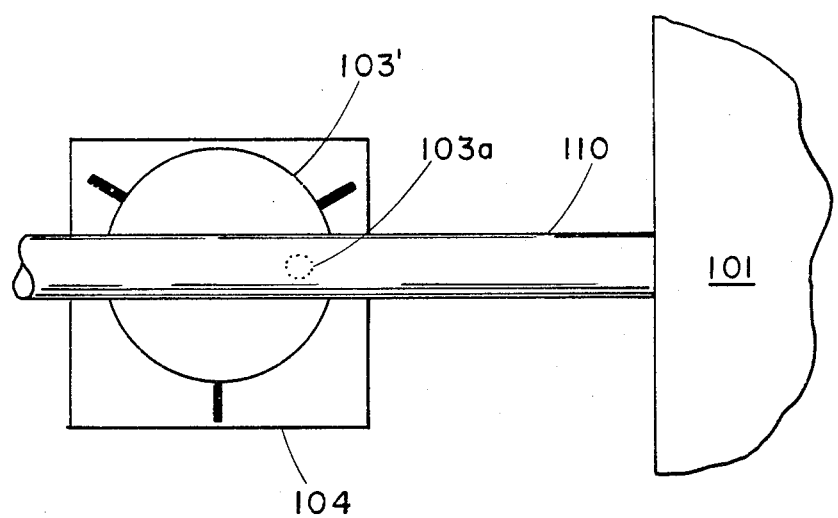
FIG. 8B is a plan view of the ultrasonic transducer area of the reed head assembly of FIG. 8A, as seen from above.

In the alternative ink stream stimulation embodiment of FIGS. 8A and 8B, an ultrasonic transducer 103' directly stimulates longitudinal vibrations in the capillary tube 110. In the partial perspective view of FIG. 8A, a piezoelectric ceramic 103' is coupled to the capillary tube 110 between capillary tube mount 111 and reed clamp 101. The piezoelectric ceramic 103' is mounted on a tripod support 104, and bonded by adhesive to the capillary tube at one point 103a. In this embodiment, the reed 100 does not extend beyond reed clamp 101. As shown from the top in the plan view of FIG. 8B, piezoelectric ceramic 103 may comprise a round, radially expanding and contracting element, which transmits longitudinal vibrations to capillary tube 110 much as shown in FIG. 7B.

In the embodiments of FIGS. 4 and 8A, the capillary tube 110 passes through reed clamp 101 in such a manner as to be free from longitudinal constraint. The reed 100 and capillary tube 110 are joined to each other at the nozzle end 108 of the reed; in the embodiment of FIG. 4, it is through this connection that the longitudinal vibration 107 of the reed induces vibration 117 of the capillary tube.

III. Driving Circuitry

In a preferred embodiment of the invention, the reed head assembly 20 includes a permanent magnet-coil structure surrounding the metal reed and capillary tube, and uses a current through the coil at the resonant frequency of the reed to induce the oscillation thereof. In order to maintain the frequency of alternation of the coil current at or near the resonant frequency of the reed, the ink jet system 10 includes driving circuitry employing a closed loop feedback principle.

This method of driving the reed models the coil 125 as a two terminal device with three voltage components, the first proportional to the coil resistance times coil current, the second proportional to coil inductance times the time derivative of coil current, and the third proportional to reed velocity. The third component, $V_{reed}$, is the back EMF through the coil resulting from the oscillation of the magnetized reed, which is proportional to the time derivative of magnetic flux through the reed. In the configuration shown in FIG. 5, magnetic flux is proportional to the slope of the reed, which in turn is proportional to the displacement of the reed from its rest position, and $V_{reed}$ is therefore proportional to reed velocity, an approximately sinusoidal function. By linking the coil current to $V_{reed}$ in a positive feedback loop, the driving circuitry ensures that the reed will be driven at resonance over time.

Figure 9:
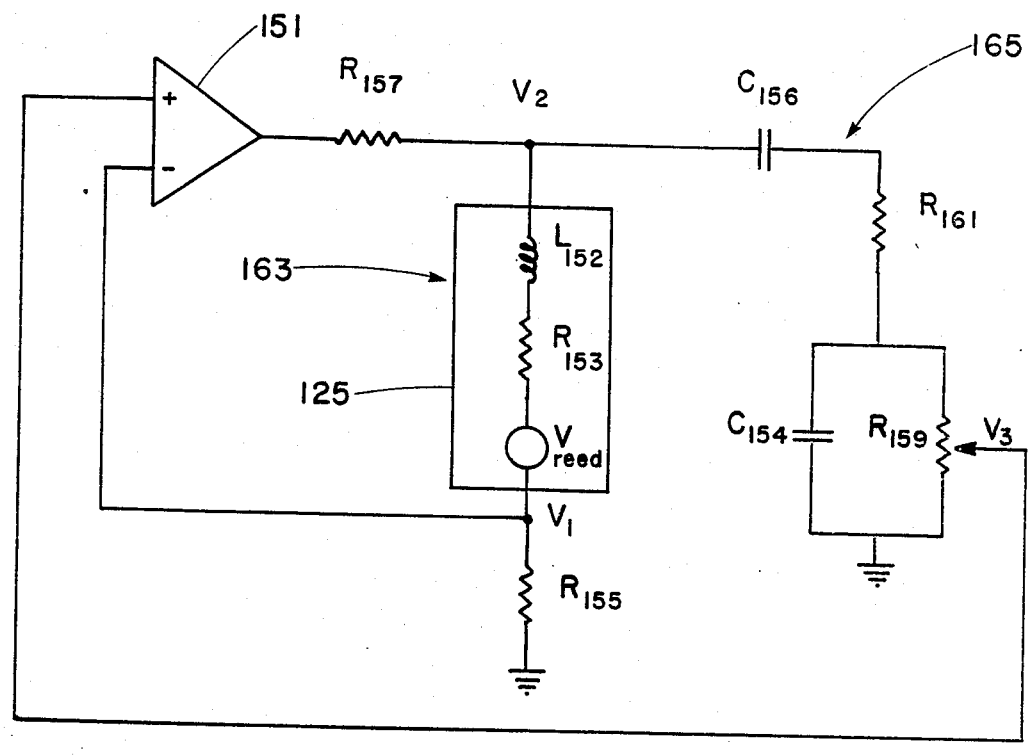
FIG. 9 is a schematic diagram of preferred driving circuitry for the reed-coil assembly of FIG. 5.

FIG. 9 is a schematic diagram of an illustrative closed loop feedback circuit 150 for driving the reed 100 at resonance. Coil 125 is modeled as an inductance $L_{152}$, resistance $R_{153}$, and voltage source $V_{reed}$, in series. The circuit may be analyzed initially in the off resonance case, omitting $V_{reed}$, and the effect of including $V_{reed}$ then examined.

Operational amplifier 151, illustratively a $\mu$A791, receives voltage $V_1$ at its negative terminal, and $V_3$ at its positive terminal. The relative values of $V_1$ and $V_3$, and the gain of op-amp 151, are such that the amplifier is driven to its full output voltage during almost the entire reed oscillation period (See FIG. 10A). Assuming that $V_3-V_1$ has a sufficient positive value to drive op-amp 151 to saturation, it may therefore be approximated as a positive supply voltage $V_0$ (illustratively around 12 volts).

After an initial transition period during which the current flowing through the branch 163 ($I_{163}$) rapidly increases while the current through branch 165 ($I_{165}$) rapidly decreases, $I_{165}$ is negligible as compared with $I_{163}$, and $I_{163} \approx I \approx$ $$\frac{V_0}{R_{153}+R_{155}+R_{157}}.$$

Referring to the illustrative component values in Table A, it can be seen that I approximately equals $V_0/R_{157}$. After this transition period, during which $V_1$ rapidly rises, $V_1$ is fixed at $$IR_{155} = V_0 R_{155}/R_{157}$$

Figure 10A:
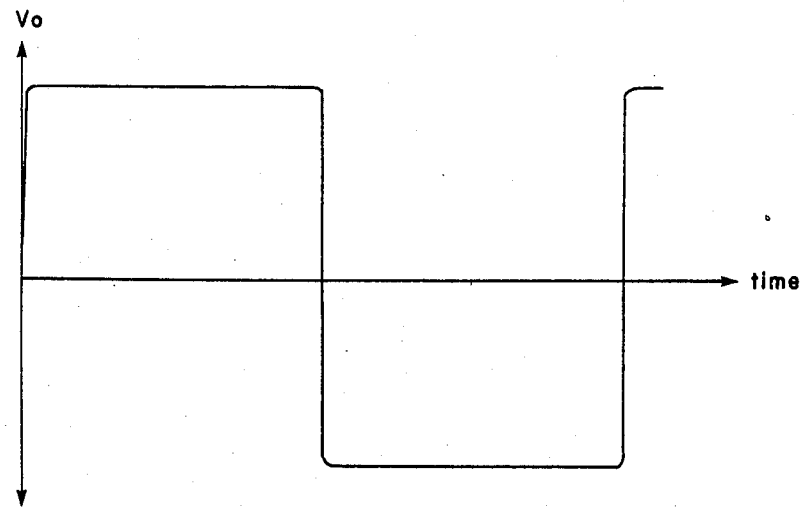
FIGS. 10A–10E are voltage waveforms for various nodes of the circuit of FIG. 9, as observed on an oscilloscope, with no reed motion.
Figure 10B:
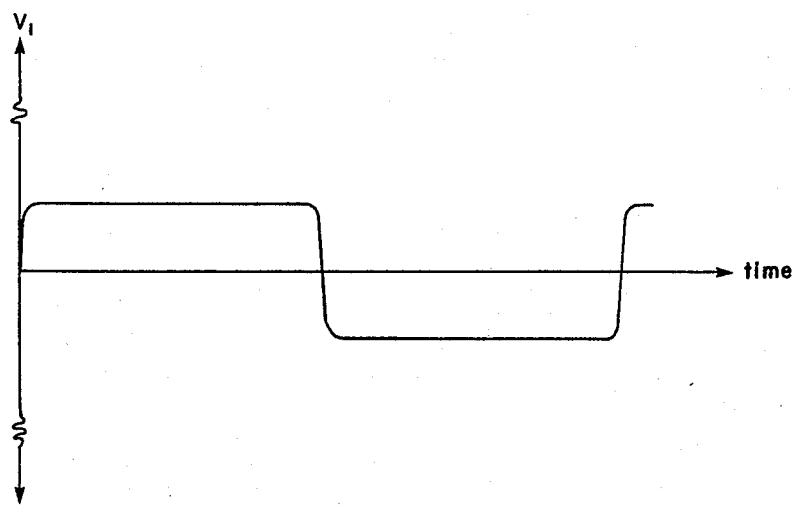
Figure 10C:
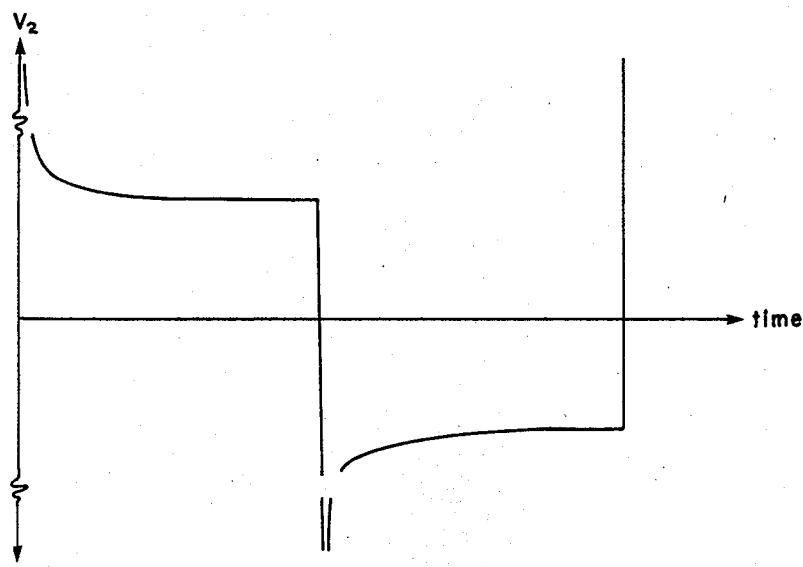

(about 1/50 $V_0$ for the values given in Table A) - See FIG. 10B $V_2$ is the voltage at the node of branches 163 and 165. Due to the presence of inductance $L_{152}$, $V_2$ initially jumps to a high value, then decays with a time constant of $$\frac{L_{152}}{R_{153}+R_{155}+R_{157}}.$$

This time constant is small as compared with the expected reed oscillation period. $V_2$ decays to the value $I_{163}$ ($R_{153}+R_{155}$) $\approx$ $$\frac{V_0(R_{153}+R_{155})}{R_{157}},$$

or about $V_0/30$ for the component values in Table A. (See FIG. 10C).

Signal $V_3$ reflects the wave form of $V_2$, as modified by the resistors and capacitors in branch 165. $V_3$ includes the initial spike of $V_2$, reduced by $C_{154}$ and $R_{161}$ acting as an integrator.

TABLE A

| Component | Approximate Value |
|---|---|
| $R_{153}$ | 8Ω |
| $L_{152}$ | 500μH |
| $R_{155}$ | 10Ω |
| $R_{157}$ | 500Ω |
| $C_{154}$ | 1.0μF |
| $R_{159}$ | 100 KΩ |
| $C_{156}$ | 0.01μF |
| $R_{161}$ | 10 KΩ |

Figure 10D:
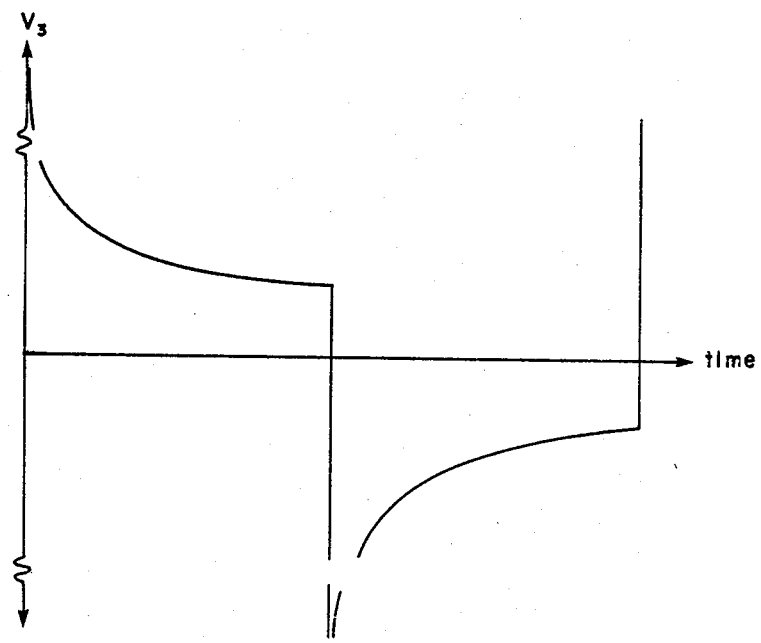

After this sharp voltage drop, $V_3$ decays with a time constant determined by the values of $R_{159}$ and $C_{156}$ (See FIG. 10D). This rate of decay is slow as compared with the expected reed oscillation period at resonance. $R_{159}$ is advantageously a potentiometer, the setting of which determines the difference $V_3-V_1$.

Figure 10E:
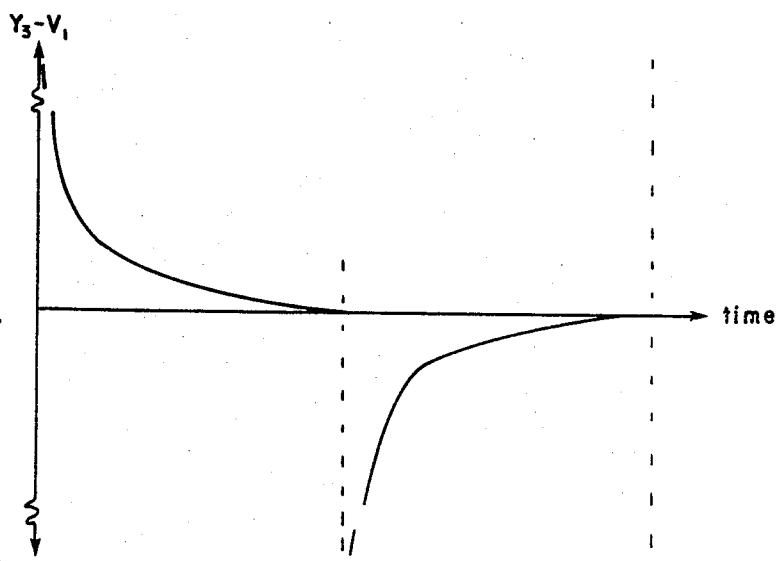

The excess of $V_3$ over $V_1$, plotted in FIG. 10E, drives the output of op-amp 151 at a positive value, as initially assumed. When $V_3$ drops below $V_1$, which will be maintained momentarily by the inductance of the coil, the input of the amplifier reverses polarity, and the output is rapidly driven to its maximum negative value. The setting of potentiometer $R_{159}$ determines the length of time for $V_3$ to decay below $V_1$. A higher setting of $V_3$ results in a longer decay period, and a lower frequency of signal oscillation. After reversal of polarity, the above cycle is repeated with all voltages negative.

Figure 11:
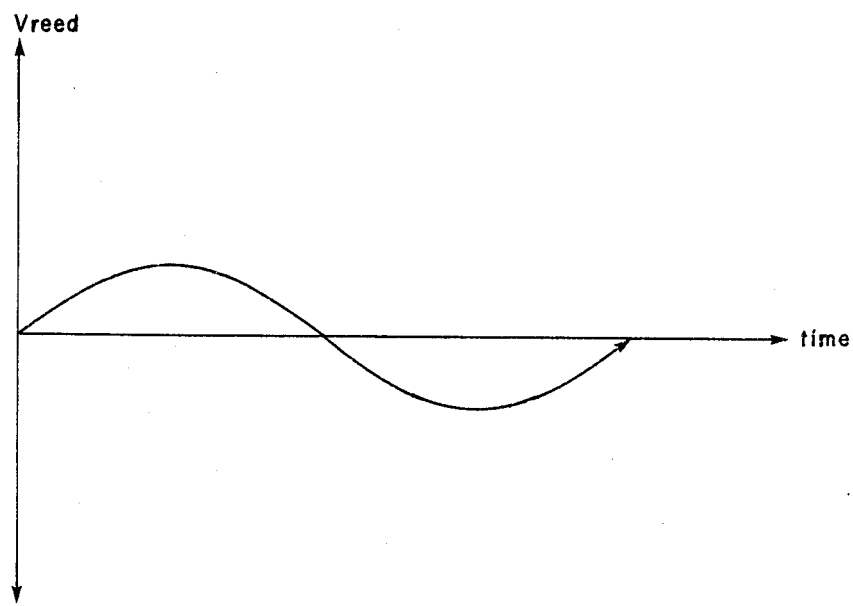
FIG. 11 is a plot of the reed motion component of coil voltage against time.
Figure 12:
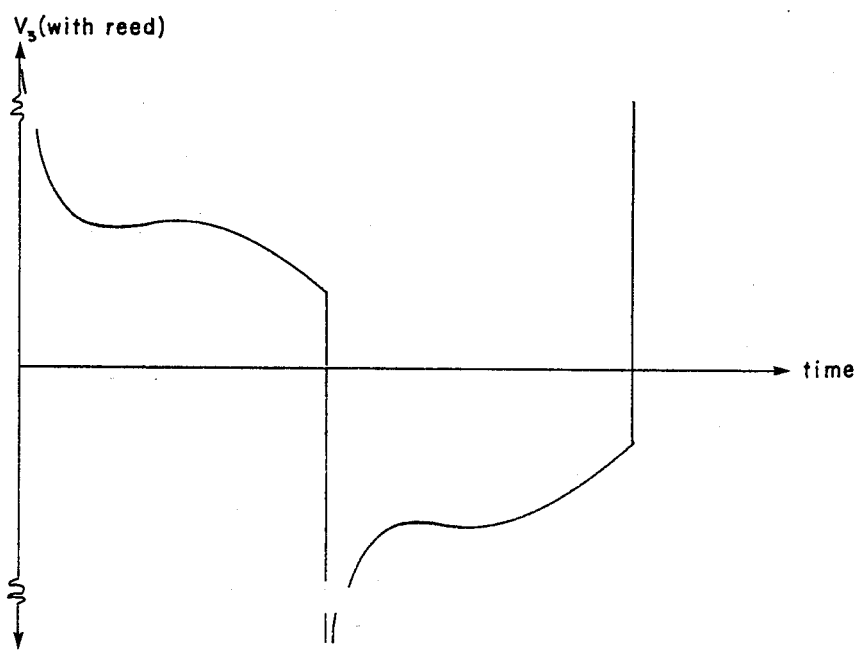
FIG. 12 is a voltage waveform for node $V_3$ of the circuit of FIG. 7, with the reed freely oscillating.

The above circuit may be used to induce oscillation of the metal reed 100 by allowing the reed to vibrate freely in response to coil current $I_{163}$, and choosing a value for $R_{159}$ to establish a blocked frequency of signal oscillation at or near (preferably somewhat above) the expected natural resonance frequency of the reed. The various wave forms must then be modified to take into account the additional sinusoidal voltage $V_{reed}$ at the terminals of coil 125, induced by the reed motion. The voltage $V_{reed}$, proportional to reed velocity, is illustrated in FIG. 11. This voltage appears in the wave form for $V_3$ as shown in FIG. 12 (the amplitude of the sinusoidal voltage is about 50 millivolts for the given circuit values). The sinusoidal component overrides the slow decay due to $R_{159}$ and $C_{156}$, and causes $V_3-V_1$ to reverse polarity after each half cycle of reed motion. This synchronizes the drive circuit to the reed motion, allowing the drive signal period to drift along with the reed's resonance frequency.

Figure 13:
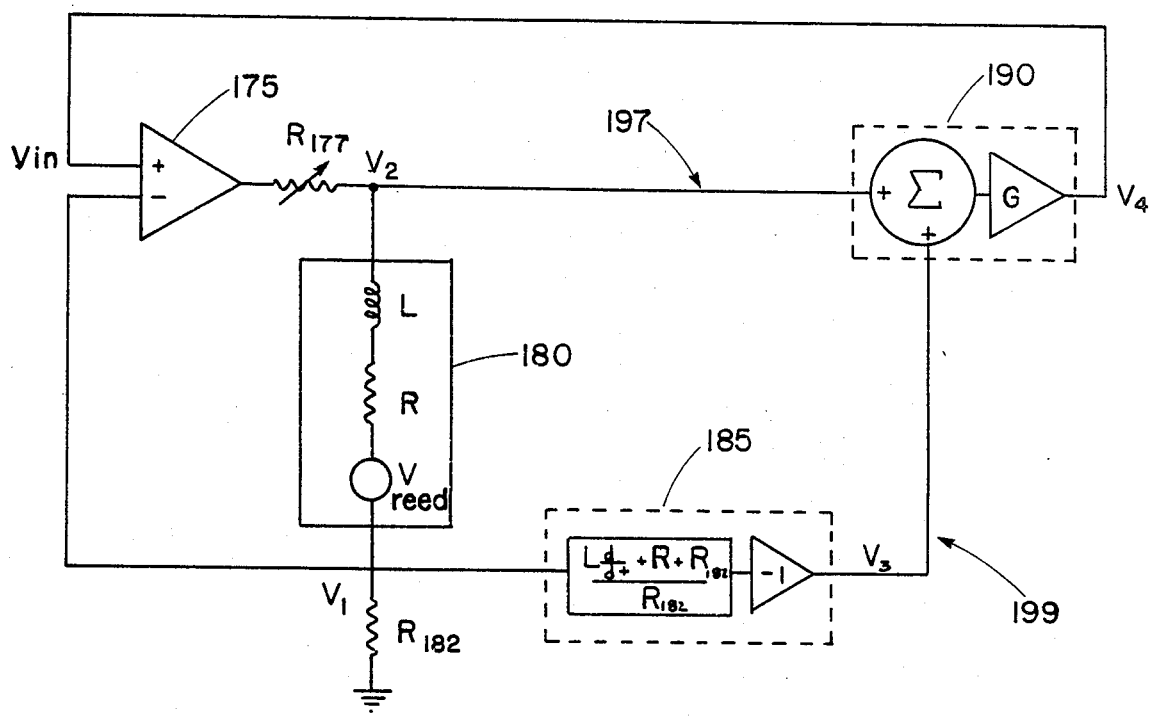
FIG. 13 is a schematic diagram of alternative driving circuitry for the reed-coil assembly of FIG. 5.

An alternative circuit design incorporating the closed loop feedback principle is exemplified by the circuit of FIG. 13. This circuit separates the coil voltage component $V_{reed}$ from the resistive and inductive components, and uses this to produce a drive signal. In contrast, the circuit of FIG. 9 adds $V_{reed}$ to the inductive and resistive voltage components of the coil, and produces an input voltage for the op-amp 151 in which the sinusoidal reed voltage dominates.

The circuit 170 includes a coil simulator/inverter 185, which monitors the current through the coil and generates a voltage equal to the resistive and inductive coil voltage components. This voltage is inverted, and added to the voltage across the coil by adder-amplifier 190. The resulting voltage is proportional to $V_{reed}$ alone. At resonance, $V_{reed}$ is in phase with the current through the coil (which is in phase with the input voltage of op-amp 175), allowing $V_{reed}$ to be amplified and fed back to op-amp 175 to produce sustained oscillation at the resonance frequency of the reed.

Operational amplifier 175, as a power operational amplifier operating at its peak output, upon receiving a signal $V_{in}$ at its positive terminal brings the voltage V1 at its negative terminal to approximately the same value. The current through the coil $I_{195}$, is essentially equal to $V_1/R_1 = V_{in}/R_1$. As a reasonable approximation, therefore, $V_2 = V_{in}/R_1(Ls + R + R_1) + V_{reed}$ (here s represents a Laplace transform in the quantities which vary with time).

Figure 14:
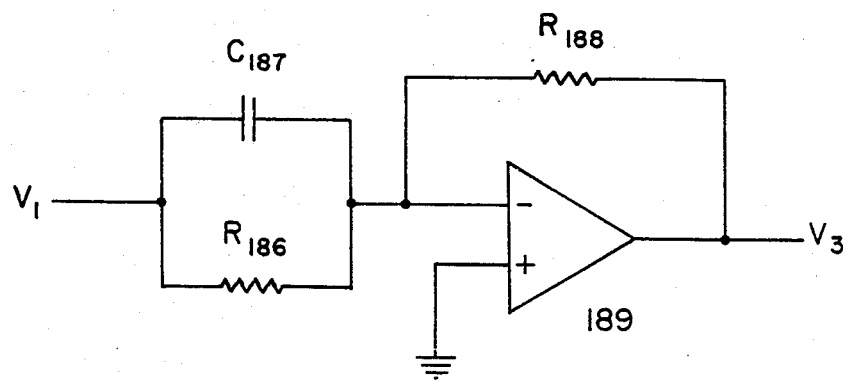
FIG. 14 is a schematic diagram of illustrative circuitry for the coil simulator/inverter of FIG. 11.

FIG. 14 illustrates one possible circuit 185 for simulating the resistive and inductive coil voltage components and inverting these. Circuit 185 receives voltage $V_{in}$ and outputs voltage $$V_3 = -(R_{188}C_{187}s + (R_{188})/R_{186})V_{in}.$$

By choosing proper values for the components of coil simulator 185, one should produce $V_3 = -(Ls/R_1 + (R + R_1)/R_1 V_{in}$. For the circuit of FIG. 14, this requires $R_{188}C_{187} = L/R_1$ and $R_{188}/R_{186} = R + R_1/R_1$. To ensure proper operation of op-amp 189 as a differentiator in circuit 185, the op-amp must meet rigorous tolerances in order to avoid spurious resonances in the frequency profile of output voltage $V_4$. This problem may be alleviated by including additional processing stages (e.g. integration circuits) in branches 197 and 199.

Adder/amplifier 190 receives inputs $V_2$ and $V_3$, adds these, and amplifies the sum by a factor G to produce an output voltage $V_4$. If coil simulator/inverter 185 has been properly adjusted as specified above, $V_2$ and $V_3$ should produce the voltage due to reed motion, $V_{reed}$, upon addition, and adder/amplifier 190 should produce $G V_{reed}$.

Figure 15:
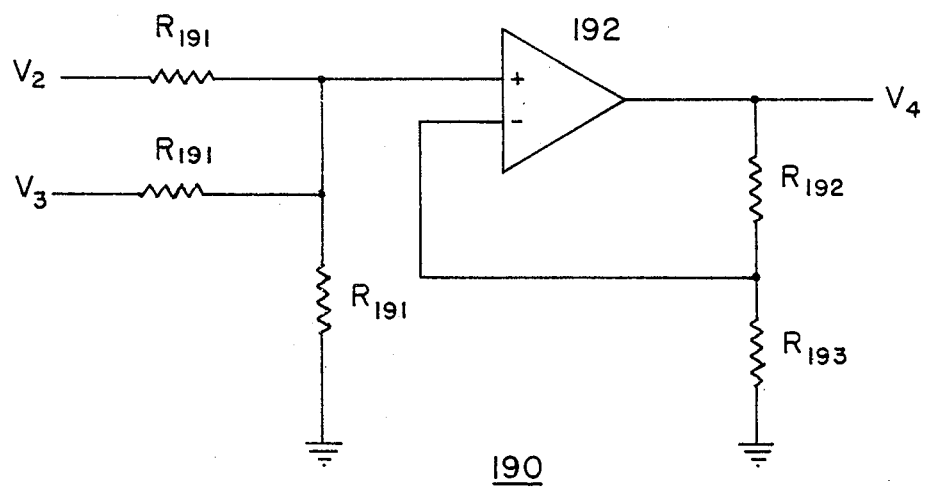
FIG. 15 is a schematic diagram of illustrative circuitry for the adder/amplifier of FIG. 11.

One possible realization of adder/amplifier 190 is shown schematically in FIG. 15. The summing amplifier of FIG. 15 produces output voltage $V_4 = (R_{192} + R_{193}/3R_{193})(V_2 = V_3)$. Thus adder/amplifier 190 may be used in the circuit 170 with $G = R_{192} + R_{193}/3R_{193}$.

At reed resonance, $V_{reed}$, which is proportional to the velocity of the reed and in phase with the current through the coil, may be expressed as $$V_{reed} = \frac{2R_e}{R_{182}} \frac{\omega_{os}}{s^2 + 2\delta\omega_{os} + \omega_0^2}$$

$V_{in}$ where $R_e$ = an equivalent resistance for the reed, $1/\beta = Q$ of the reed, and $\omega_o$ is the natural resonance frequency of the reed. In order to produce a driving current for the coil which alternates at the reed's resonance frequency, it is necessary to produce an output voltage $V_4$ which is slightly larger than the hypothetical input voltage $V_{in}$ at this frequency, and which assumes a relatively low value at other frequencies. With reference to the above formula for $V_{reed}$, this requires a G slightly larger than $R_{182}/R_e\beta$. Thus, choosing proper component values for adder/amplifier 190 ensures that the coil in current 170 will be driven at its resonance frequency over time, as in circuit 150.

Both circuits 150 and 170 provide the basis for the synchronizing signal which is provided to electronic controller 40 via line 47 (see FIG. 2). The output of op-amp 151 (or 175) is fed into a squaring circuit, with a delay adjustment built into either this portion of the driver circuit, or into the electronic controller 40. The delay adjustment provides precise synchronization of the charging process with the position of the ink projecting member. Circuitry to implement these functions will be well known to skilled practicioners of the art.

It should be noted that circuits 150 and 170 are presented in detail for illustrative purposes only. There are numerous variations of both types of closed loop feedback circuits which will be apparent to those skilled in the art. Both circuit types involve deriving a signal from the voltage across the coil in which $V_{reed}$ dominates. In the circuit 150 and similar circuits, $V_3$ contains a sinusoidal component reflecting $V_{reed}$, and an exponentially decaying component, with the first component essentially governing the behavior of the circuit. In circuit 170 and related circuits, the output signal $V_4$ is essentially proportional to $V_{reed}$.

IV. Charging, Deflection, and Collection of the Ink Jet

The Ink Jet System 10 of the present invention includes a charging tunnel or electrode 30 which deposits a charge on selected ink droplets, as regulated by electronic controller 40. The geometry of the tunnel and electromagnetic principles of the ink stream charging process are known in the art. The method employed is that of induction charging, by applying a potential difference between the charging tunnel and a conductive connection to the ink stream in the capillary tube. The ink stream breaks up into droplets, either due to natural forces alone, or as supplemented by artificial stimulation of the ink stream by means such as ultrasonic transducer 103 (cf. FIG. 4). The breakup occurs either within the tunnel or within an acceptable interval therefrom on the nozzle side.

The present system differs from similar prior art systems as to the purpose of the charging process. The drops are charged not to control their eventual location on the record member 70 (which is determined by the nozzle oscillation), but merely to determine whether or not they will be removed from the ink stream. As a result, the magnitude of charge which is applied to selected drops is critical only in that it must be sufficient to ensure the separation of the charged and uncharged drops in the deflection electrodes 50, and the interception of one of these groups by intercepting means 60.

The present system is also characterized by a lesser degree of control over the charging of individual droplets which are formed in charging electrode 30. As in certain prior art systems, the present ink jet system forms an image on the record member by printing individual image components. The present invention differs from many of such systems, however, in that it does not print with individual droplets, but with groups of droplets, or "character elements". The number of droplets in a character element is that number charged by a voltage pulse of predetermined duration which is applied to the charging electrode.

The duration of these voltage pulses is a function of the frequency of reed oscillation and the number of desired character elements per scan. The process of dividing scans on the record member into useful character elements is further complicated by the desirability of restricting the range of print pulses to a fraction of each scan cycle. With reference to FIG. 2, the ranges 95 of character elements occupy only part of each up stroke. By avoiding the peak of each cycle, this embodiment of the printing method of the invention avoids easily observable non-linearities in a column of character elements. On the other hand, it is advisable to maximize the height of each column consistent with the above factor, in order to generate characters of reasonable size. It has been discovered that the above requirements may be reconciled by using about 70 percent of each half cycle, or about 126°.

In a preferred embodiment of the invention, only either the up strokes or the down strokes of nozzle oscillation are used to produce character elements. Printing distortions due to aerodynamic effects on the ink jet are minimized if only up or down strokes are utilized.

Figure 16:
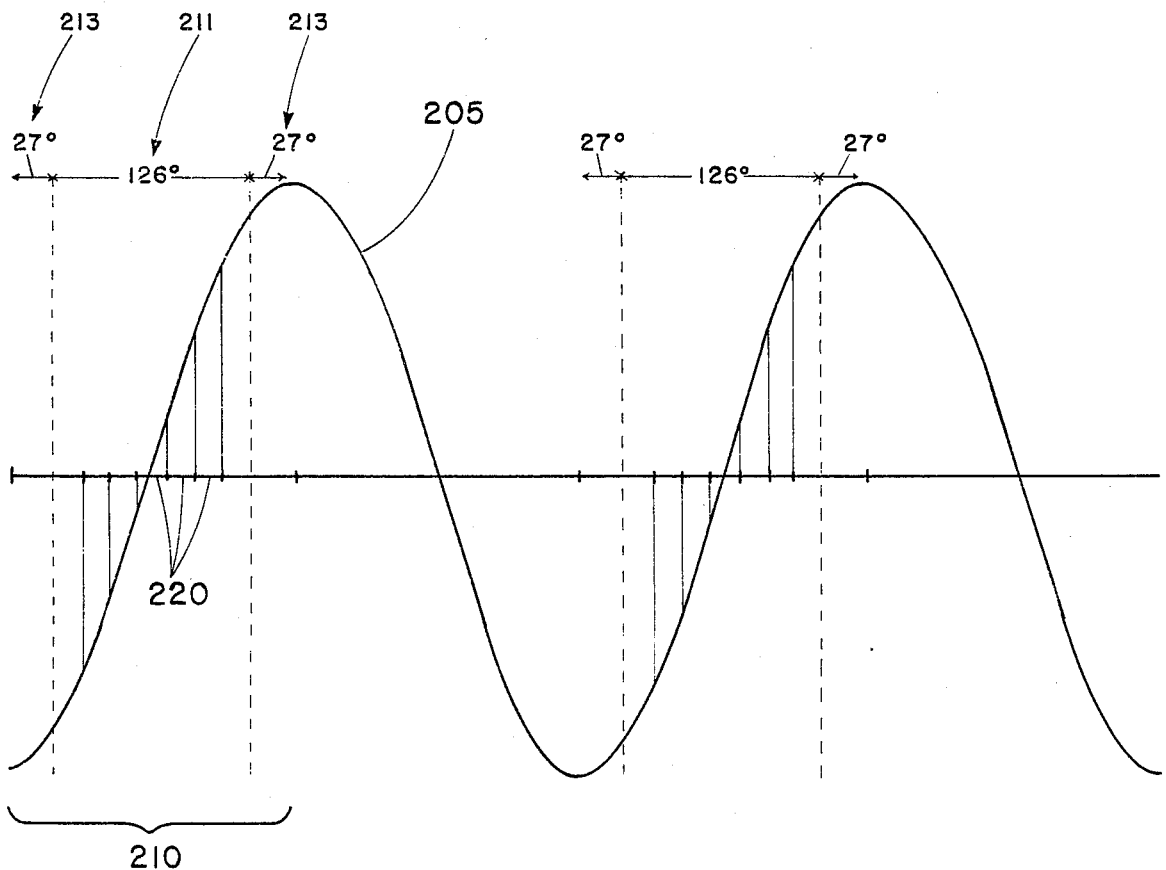
FIG. 16 is a scanning trace on a record member, subdivided into usable character elements, in accordance with a preferred embodiment of the invention.

In the schematic view of FIG. 16, the sinusoidal trace 205 represents the ideal scanning pattern of the ink jet on the record member as well as a plot of nozzle deflection against time. The horizontal axis corresponds both to the horizontal coordinate on the record member, which moves horizontally at a linear rate of speed, and to the time of charging the ink drops in a character element. Each rising half cycle 210 of nozzle oscillation is subdivided into a central 126° range 211 and two 27° peak segments 213. The separation of consecutive half cycles is exaggerated for the purpose of illustration. The central 126° is further subdivided into a given number of time intervals or character elements 220, which represent the duration of voltage pulses which are applied by electronic controller 40 to charging electrode 30. In FIG. 16, each 126° range is subdivided into seven character elements.

In order to print 5×7 matrix character, five half cycles of scan would be used per character (five columns), with seven character elements per column (seven rows). Thus, the illustrative pulse train 230 in FIG. 17 would be used to print the character H in FIG. 3. Note that equal "on" voltage pulses 235 are used in the printing of character elements in any location. The location of each character element in the printed character results from the motion and position of the nozzle when emitting the ink droplets which form that character element. The synchronization of voltage switching and nozzle deflection occurs through the signal supplied to electronic controller 40 from driving circuitry 150 (cf. Section III).

Figure 18:
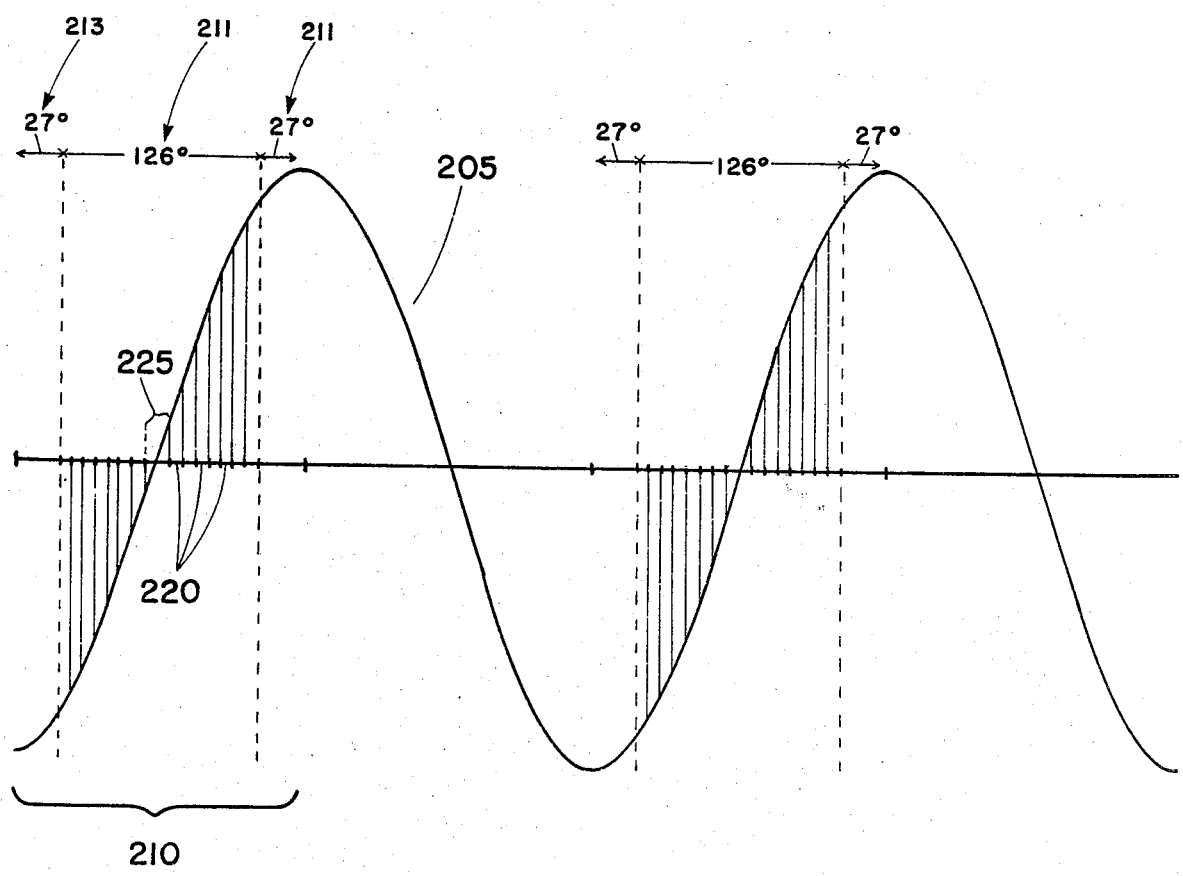
FIG. 18 is a scanning trace on a record member, subdivided into usable character elements, in accordance with an alternative embodiment of the invention.

In an alternative embodiment, a single scan of nozzle oscillation may be used to print two lines of characters. As seen in FIG. 18, the central 126° range is subdivided into 16 intervals, comprising upper and lower ranges of seven intervals separated by two intervals. This would be used to print two lines of 5×7 characters with a two character element space separation 225. The resulting characters are somewhat less than half as large as those in the one line embodiment.

Figure 17:
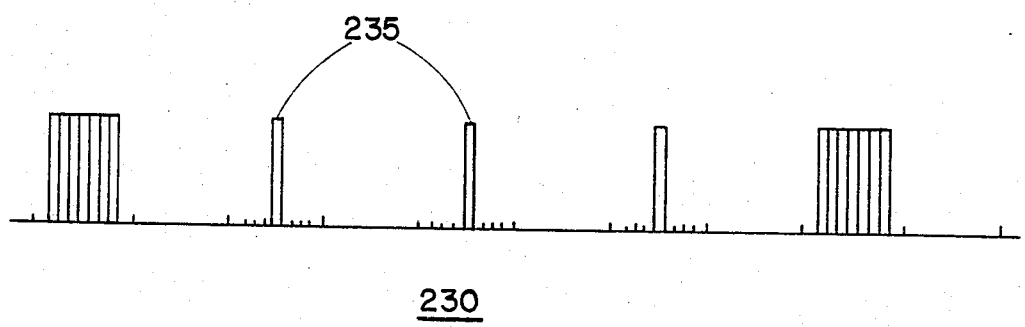
FIG. 17 is an illustrative voltage pulse train produced by the electronic controller of FIG. 2, for printing the character 'H' of FIG. 3.

While the "on" voltage pulses in FIG. 17 are of the same magnitude, in practice these pulses may vary somewhat as long as the droplets so charged will be properly separated from the uncharged droplets in deflection electrode 60. A problem which occurs in this regard is the charging of certain droplets during the transition period between "on" and "off" voltage levels. These droplets will receive an intermediate level of charge which may cause problems in the deflection/interception process. The droplets so charged may not reach the intercepting member in an embodiment where the deflected drops are intercepted, and may undesirably impinge on the intercepting member which is intended to catch undeflected drops in the alternative embodiment.

This problem may be solved or alleviated in a number of ways. In the alternative embodiment in which signals from the drop excitational means are used to properly synchronize the charging voltage switching with the drop formation process, such a problem does not exist. Short of this very complicated approach, there are a number of features of the present ink jet system which mitigate the problem. The inclusion of an ultrasonic transducer 103 in the reed head assembly 20 causes the ink stream 27 to break up into individual droplets 29 at a point closer to the nozzle 115 than would naturally occur otherwise. The combination of this stimulation with the use of a conductive ink (desirably 2000 ohm centimeters or less) results in a relatively low resistance of the ink stream 27 between the conductive connection in the nozzle and the charging location. This, in turn, leads to a faster transient response to the switching of voltage levels. As discussed below, the problem may also be alleviated by a judicious placement of the intercepting member.

The danger of image degradation due to the loss of intermediately charged drops is minimized by the fact that a character element in the present ink jet printing method comprises a group of similarly charged individual ink droplets. Using a conductive ink in conjunction with nozzle stimulation of the ink stream, typically at most one drop will be lost from the group of drops in a character element. The average number of ink drops per character element is a function of stimulation parameters, nozzle size, choice of character matrix, and other factors. In general, it is desirable to have a larger nozzle size for a higher frequency reed to allow an increased flow of ink, as the character generation rate increases with reed frequency. Thus, for a reed frequency of 1.8 KHz, an ink jet diameter of 40 microns (requiring a slightly higher nozzle inner diameter), with an ink flow rate of 3.2 cubic centimeters/minute, stimulating the ink stream at 170 KHz, and dividing each cycle of oscillation into 24 character elements, there will be about 4 ink drops/character element.

A greater number of ink drops per character element will result from lowering the nozzle diameter and flow rate; this also decreases the density of the image. For a lower frequency reed, a lower flow rate and higher stimulation frequency results in a larger drop per character element ratio. Illustratively, for a 500 to 2000 KHz frequency range of reed oscillation, there is a corresponding range of from 30 down to 4 drops/character element, with fewer drops at high reed frequencies.

The above characteristics present a practical limitation on the range of usable reed frequencies. While the loss of one drop out of four per character element at 2 KHz will not critically affect image quality, the loss of one out of two or three drops at higher frequencies would cause a clearly visible difference in the image. This upper frequency is sufficient, however, for ink jet printing of desirably high character generation rates.

After selective charging of the ink drops in charging electrode 30, they continue their course between two DC deflection electrodes 50. In the illustrative plan view of FIG. 19, these are combined with a charging tunnel 30 to produce a more compact electrode structure 55. Ink stream 27 enters charging tunnel 30 where it breaks up into individual droplets 29, which are charged by a selective application of a control voltage through lead 45, as discussed above. With the conductive connection to the ink stream in the nozzle at ground, a control voltage of zero results in no charging of the drops, which a nonzero control voltage, illustratively 350 volts, is used to charge groups of drops in character elements for which deflection is desired.

Charged and uncharged drops 29 emerge from the charging tunnel 30 to pass between DC deflection electrodes 51 and 52. Electrode 52 is connected to a −2,000 volt source via lead 46, while electrode 51 is grounded at 47. This results in a DC deflection field which is substantially perpendicular to the undeflected ink jet path, and parallel to the surface of record member 70.

Figure 19:
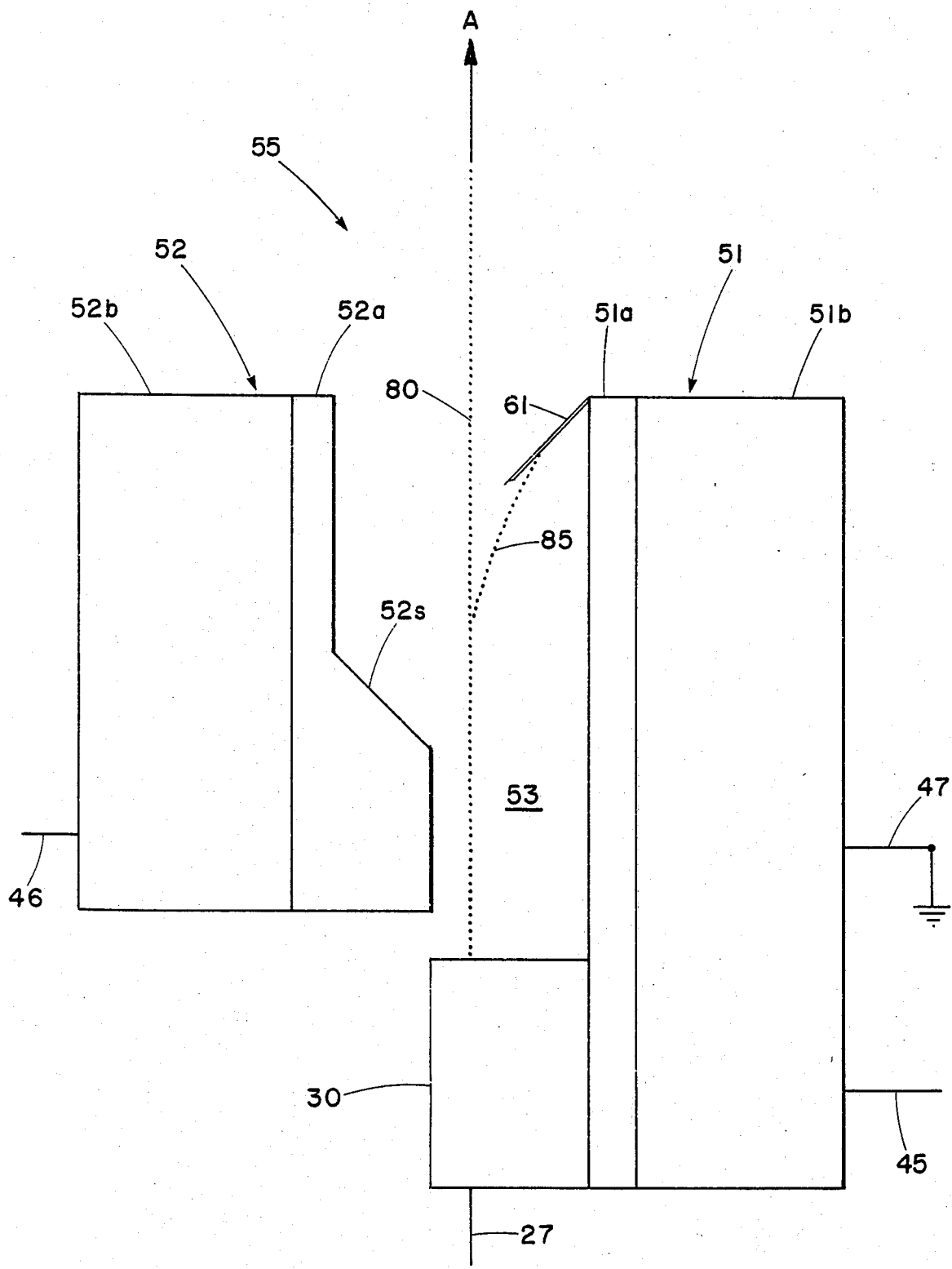
FIG. 19 is a plan view of the charging/deflection/interception area in accordance with a preferred embodiment of the invention.

In embodiment of FIG. 19, electrodes 51 and 52 comprise porous stainless steel electrodes 51a (the "control electrode") and 52a (the "deflection electrode") mounted on structures 51b and 52b which are used in collecting intercepted ink drops. A thicker section 52s of deflection electrode 52a, a "deflection step", creates an enhanced deflection field in the narrower anterior portion of region 53. It is in this region that the charged and uncharged ink drops begin to separate, with the uncharged drops 80 continuing straight on course as indicated by arrow A, while the charged drops 85 deflect toward control electrode 51a.

As shown in the embodiment of FIG. 19, interception means 60 consists of a knife edge 61 which is appended to the far end of the wall of control electrode 51a. Ink drops 85 desirably are deflected in a path which will cause them to impinge upon the knife edge and flow to the porous electrode 51a. In practice, invariably a number of stray drops deviate toward the control electrode short of the knife edge, toward the deflection step 52s, and rebound off the knife edge 61 in a spray toward deflection electrode 52a.

In a preferred embodiment of the invention, the electrode structure 55 incorporates an ink jet collection system as described in copending patent application No. 921,672. This system is used to collect the deflected droplets of solvent-based ink in an ink jet, separate the solvent from the remainder of the ink, and uses the resulting solvent-laden air to control stray ink drops in the anterior deflection region 53. In the electrode structure illustrated in FIG. 19, ink drops are drawn through a vacuum plenum 51b, routed through collecting, separating, and filtering means (not shown), and solvent-laden air is recycled through structure 52b to be blown out the porous deflection electrode 52a. This minimizes the problem of smaller stray ink drops drying on the porous electrodes, which causes arcing and loss of deflection voltage.

Figure 20:
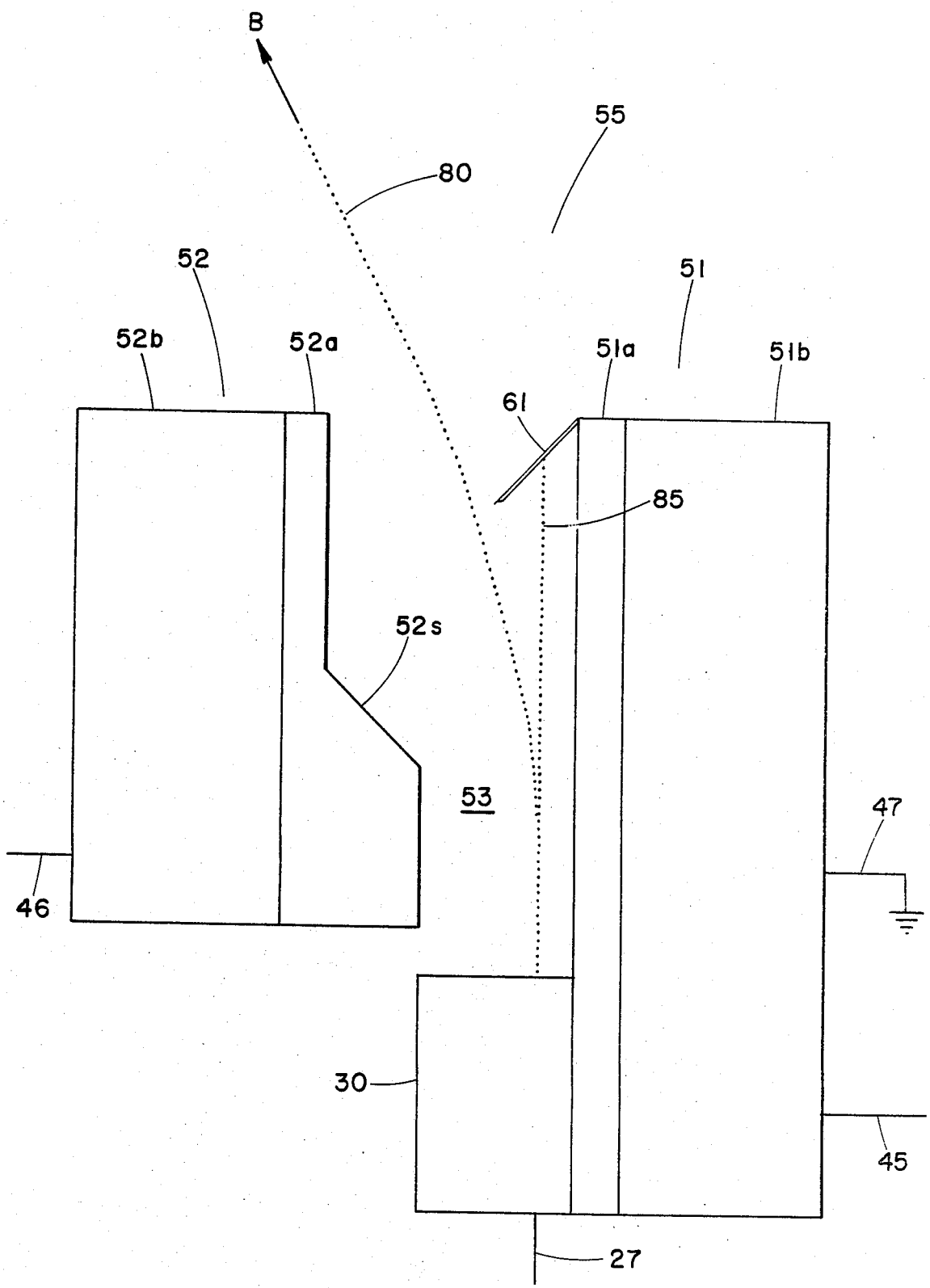
FIG. 20 is a plan view of the charging/deflection/interception area in accordance with an alternative embodiment of the invention.

In an alternative embodiment of the invention, using the electrode structure illustrated in FIG. 20, the bias voltage applied to electrode 52a is changed from negative to positive, and the signal applied to the charging electrode 30 is inverted (the positive charging voltage levels become zero, while the zero voltage levels become positive). The result is that those ink drops which are desired for printing are given a negative charge, and are deflected toward deflection electrode 52a. In this embodiment, the ink stream is aimed toward the knife edge 61, and the undeflected drops 85 are intercepted while the deflected drops 80 pass through to reach record member 70, in a direction indicated by arrow B.

Knife edge 61 should be carefully placed so as to minimize the loss of ink drops which have received an intermediate charge level in charging electrode 30. At the same time, the knife edge should not be located so as to intercept ink droplets which are intended to reach the record member 70. This compromise placement may be determined by empirical means well known to skilled practitioners of the art.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. Apparatus for forming images on a record member with droplets of ink, comprising:
   a. a record member;
   b. means for projecting a stream of ink toward the record member, said projecting means including an ink projecting member in the form of a capillary tube having two ends with an axis along which the ink is projected, a nozzle capping said capillary tube at one end, means for supplying ink to the capillary tube under pressure to cause a stream of the ink to be projected from the nozzle toward the record member, and a capillary tube mount to which the capillary tube is fixed at the end opposite said nozzle;
   c. a driving member which is joined to said ink projecting member, comprising a metal reed, a reed clamp located at the midsection of said capillary tube before the end of the reed to fix the metal reed in position, and means for inducing microscopic longitudinal vibrations of the joined metal reed and capillary tube, yoked to said metal reed between said capillary tube mount and said reed clamp, comprising an ultrasonic transducing means yoked to an end of said metal reed, away from said nozzle, including a metal paddle extension of said metal reed which is of the same thickness as the metal reed, but of greater width, and a piezoelectric ceramic element appended to the underside of the metal paddle extension and of considerably greater thickness than said metal paddle extension, with a potential difference being applied between said metal paddle extension and a lower surface of said piezoelectric ceramic element to cause a microscopic vibration of the element, a longitudinal component of which is transmitted through said metal paddle extension to said metal reed;
   d. means for inducing a macroscopic oscillation of the joined ink projecting member and driving member at a resonant frequency of the joined members, said oscillation being in a direction substantially transverse to the axis of the projecting means, whereby the stream of ink is projected within a plane of trajectory variation defined by the axis of the projecting means and the direction of oscillation;
   e. closed loop feedback means for ensuring that the joined projecting member and driving member oscillate at or near the resonant frequency of the driving member over time;
   f. means for electrostatically charging drops of ink at a point at which the stream breaks up into individual drops;
   g. means for controlling said charging means to form two charge groups having either a "deflection" or a "no deflection" charge on drops emerging from the projecting means during predetermined portions of the oscillation period;
   h. means for inducing the deflection of drops bearing a "deflection" charge in a direction substantially transverse to the plane of trajectory variation, while allowing the drops bearing a "no deflection" charge to remain on course;

i. means for intercepting drops in one of the two charge groups after deflection of the drops bearing a "deflection" charge; and j. means for causing a relative movement of the record member in a direction substantially transverse to the plane of trajectory variation, whereby the drops of the nonintercepted charge group are deposited on the record member to form an image.

2. Apparatus in accordance with claim 1 wherein said piezoelectric ceramic element is round in cross section, as seen from the bottom.

3. Apparatus in accordance with claim 1 wherein said piezoelectric ceramic element is rectangular in cross section, as seen from the bottom.

4. Apparatus in accordance with claim 1 wherein said reed clamp is composed of a plastics material.

5. Apparatus in accordance with claim 1 wherein the means for controlling the charging means receives a signal from the closed loop feedback means, said signal being indicative of a fixed point of the cycle of oscillation of the joined projecting means and driving member.

6. Apparatus in accordance with claim 1 wherein the intercepting means comprises an intercepting member in the path of the drops deflected by the deflecting means.

7. Apparatus in accordance with claim 1 wherein the intercepting means comprises an intercepting member in the path of the drops allowed to remain on course by the deflecting means.

8. Apparatus in accordance with claim 1 further comprising means for collecting the intercepted drops of ink.

9. Apparatus in accordance with claim 1 wherein the means for inducing the macroscopic oscillation of said joined metal reed and capillary tube comprises:

a magnetic coil which surrounds the joined metal reed and capillary tube between the reed clamp and the nozzle, through which a current is passed, thereby inducing a magnetic moment within said metal reed;

a permanent magnet, having poles which straddle the joined metal reed and capillary tube between the reed clamp and the nozzle, which causes a torque on said metal reed by means of an interaction of its field with the magnetic moment induced in the metal reed; and a periodic alternation of said current at the lowest resonant frequency of said joined metal reed loaded by said capillary tube, considered as a cantilever beam anchored at said reed clamp.

10. Apparatus in accordance with claim 9 wherein a voltage across the magnetic coil has a resistive component, an inductive component, and a reed motion component, and wherein the closed loop feedback means comprises means for monitoring the voltage across the coil, means for deriving a signal from said voltage in which the reed motion component dominates, means for amplifying said signal to create a supply voltage, and means for applying said supply voltage to the magnetic coil.

* * * * *